United States Patent
Craig

(10) Patent No.: US 7,197,036 B2
(45) Date of Patent: Mar. 27, 2007

(54) METHODS AND SYSTEMS FOR ROUTING MESSAGES BETWEEN A MATED PAIR OF ROUTING NODES WITH A DISTRIBUTED PROCESSING ARCHITECTURE AND ONE OR MORE REDUNDANTLY CONNECTED REMOTE APPLICATIONS

(76) Inventor: Jeffrey Alan Craig, 1209 Highland Trail, Chapel Hill, NC (US) 27516

( * ) Notice: Subject to any disclaimer, the term of this patent is extended or adjusted under 35 U.S.C. 154(b) by 102 days.

(21) Appl. No.: 10/376,001

(22) Filed: Feb. 27, 2003

(65) Prior Publication Data

US 2003/0169779 A1  Sep. 11, 2003

Related U.S. Application Data

(63) Continuation-in-part of application No. 10/222,457, filed on Aug. 16, 2002, now Pat. No. 7,136,477.

(60) Provisional application No. 60/312,984, filed on Aug. 16, 2001.

(51) Int. Cl.
*H04L 12/28* (2006.01)
(52) U.S. Cl. ...................... 370/392; 370/522
(58) Field of Classification Search ............. 370/352, 370/389, 392, 401, 410, 522
See application file for complete search history.

(56) References Cited

U.S. PATENT DOCUMENTS

| | | | |
|---|---|---|---|
| 5,384,840 A | 1/1995 | Blatchford et al. | |
| 5,430,719 A | 7/1995 | Weisser, Jr. | |
| 5,438,568 A | 8/1995 | Weisser, Jr. | |
| 5,440,626 A | 8/1995 | Boyle et al. | |
| 5,454,034 A | 9/1995 | Martin | |
| 5,481,673 A | 1/1996 | Michelson | |
| 5,680,437 A | 10/1997 | Segal | |
| 5,898,667 A * | 4/1999 | Longfield et al. | 370/225 |
| 6,167,129 A * | 12/2000 | Fikis et al. | 379/230 |
| 6,292,479 B1 * | 9/2001 | Bartholomew et al. | 370/352 |

(Continued)

FOREIGN PATENT DOCUMENTS

CA  2 334 472  8/2001

(Continued)

OTHER PUBLICATIONS

Notice of Allowance in Commonly Assigned, Co-Pending U.S. Appl. No. 10/222,457, dated Jul. 8, 2004.

(Continued)

*Primary Examiner*—Huy D. Vu
*Assistant Examiner*—Christine Ng
(74) *Attorney, Agent, or Firm*—Jenkins, Wilson, Taylor & Hunt, P.A.

(57) ABSTRACT

Methods and systems for routing messages between a mated pair of routing nodes with a distributed processing architecture and one or more redundantly connected remote applications are disclosed. A mated pair of routing nodes uses private point codes to distribute messages destined for remote applications among internal processing modules and between the routing nodes. The routing nodes replace the private point codes with a shared point code before sending the messages to one of the remote applications. When communicating with external PSTN nodes, the mated pair of routing nodes uses the shared point code.

31 Claims, 12 Drawing Sheets

U.S. PATENT DOCUMENTS

| | | | |
|---|---|---|---|
| 6,314,109 B1* | 11/2001 | Oman | 370/467 |
| 6,324,183 B1* | 11/2001 | Miller et al. | 370/467 |
| 6,411,632 B2 | 6/2002 | Lindgren et al. | |
| 6,487,286 B1 | 11/2002 | Reaves et al. | |
| 6,507,649 B1 | 1/2003 | Tovander | |
| 6,515,985 B2 | 2/2003 | Shmulevich et al. | |
| 6,522,741 B1 | 2/2003 | Crowl | |
| 6,606,379 B2* | 8/2003 | Khadri et al. | 379/221.1 |
| 6,674,748 B1* | 1/2004 | Dykhuizen et al. | 370/352 |
| 6,678,242 B1 | 1/2004 | Simon | |
| 6,717,940 B1* | 4/2004 | McGrew | 370/354 |
| 6,823,061 B2* | 11/2004 | Prasad et al. | 379/230 |
| 2001/0033549 A1 | 10/2001 | Yi | |
| 2001/0036173 A1* | 11/2001 | Shmulevich et al. | 370/352 |
| 2002/0131427 A1 | 9/2002 | Niermann | |
| 2002/0196779 A1 | 12/2002 | Khadri et al. | |
| 2003/0016684 A1* | 1/2003 | Prasad et al. | 370/410 |
| 2003/0118001 A1 | 6/2003 | Prasad et al. | |

FOREIGN PATENT DOCUMENTS

| | | |
|---|---|---|
| WO | WO 00/65785 | 11/2000 |

OTHER PUBLICATIONS

Notification of Transmittal of the International Search Report and the Written Opinion of the International Searching Authority, of the Declaration in PCT Application No. 04/05558 (Sep. 24, 2004).
Pai, "In-Building Wireless: The Next Generation," TelephonyOnline.com, pp. 1-4 (Jun. 30, 2004).
Handa, "In Building Wireless: the Next Generation," TMCnet.com, pp. 1-7 (Feb. 12, 2004).
Fitchard, "A New Voice in the Boardroom," Wireless Review, pp. 1-3 (Sep. 1, 2003).
"Fixed Wireless Technology," ISP PLanet, pp. 1-4 (May 14, 2002).
Martinek, "Office on the Fly," Wireless Review, pp. 1-4 (Jul. 15, 2001).
"Mar. Networks 3300 Integrated Communications Platform," Mitel Networks Corporation, pp. 1-34 (Jul. 2001).
Swartz, "Ready, Set, Wireless Office!," Wireless Review, pp. 1-4 (Jun. 1, 2000).
"Telstra and Ericsson Trial Next Generation Wirelss Office Solution," Ericsson, pp. 1-2 (Apr. 28, 200).
"Mitel and Ericsson Join Forces to Deliver an Integrated Digital Wireless Office Solution with PBX Functionality-Company Business and Marketing," Cambridge Telcom Report, pp. 1-4 (Apr. 24, 2000).
"Market and Development Agreement Targets Customers Looking for Ways to Become More Productive Through Convenient and Cost-Effective Communication," Ericsson Press Release, pp. 1-2 (Apr. 4, 2000).
Sulkin, "Emerginging Options for Wireless PBXs," Voice2000, pp. 1-8 (Feb. 2000).
Drzewianowksi, "WLANs—For the Picking," Communications Solutions™ Next-Gen Networks, pp. 1-9 (Jan. 2000).
"The Wireless Business Connection," Second Quarter 2000 Report, The Phillips Group—Infotech, pp. 1-9 (2000).
"Ericsson Announces General Availability of Its Mobile Advantatge Wireless Office System," Ericsson Press Release, pp. 1-2 (Nov. 4, 1999).
"Corporate Offices to Go Wireless First Australian GSM on the Net Trial," Ericsson Press Release, pp. 1-3 (Aug. 11, 1999).
"Ericsson Solution Chosen for World's First Combined DECT/GSM Communications Service," Ericsson, pp. 1-9 (Jun. 21, 1999).
"Enterprise IP Gateway," Ericsson, pp. 1-6 (1999).
"The Ericsson IPT System," Ericsson, pp. 1-8 (1999).
Johanson et al., "Mobile Advantage Wireless Office—A Digital Wireless Office Systems for TDMA/136 Networks," Ericsson Review No. 1, pp. 20-27 (1999).
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
"Ericsson Wireless Office Services to Provide Digital System Through AT&T Wireless Services," Ericsson Press Release, pp. 1-2 (Apr. 17, 1998).
Woods, "Fresno Bee Still Buzzing About Wireless," TechNews, pp. 1-2 (1995).
"teleSys, Announces the Compatibility of Ericsson's Mobile Advantage Wireless Office and teleSys' MACH7-IP Gateway," teleSys Software—Press Release, pp. 1-2 (Publication Date Unknown).
Commonly-Assigned, Co-Pending U.S. Appl. No. 10/222,457 filed Aug. 16, 2002.
Notification Concerning Transmittal of Copy of International Preliminary Report on Patentability (Chapter I of the Patent Cooperation Treaty) in International Application No. PCT/US2004/005558 (Sep. 15, 2005).
Supplementary Partial European Search Report in European Application No. 02753488.2-2416 (Aug. 22, 2005).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," PACKET, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 For Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN SIM Authentication and Authorization," Cisco Systems, Inc., pp. 1-13 (Copyright 1992-2003).
Barry, "A Signal for Savings," PACKET, Cisco Systems Users Magazine, vol. 14, No. 4, pp. Cover; 19-21; and 81 (Fourth Quarter 2002).
"Agilent Technologies and Cisco Systems SS7 over IP White Paper," Cisco Systems, Inc. and Agilent Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
"Agilent acceSS7 Business Intelligence," Agilent Technologies, pp. 1-6 (Copyright 2001-Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).

Jungmaier et al., "Performance Evaluation of the Stream Control Transmission Protocol," pp. 141-148 (Jun. 26, 2000).

"Topsail Beach—SS7 Over IP—" Cisco Systems, Inc., pp. 1-16 (Copyright 1999).

Et-Toumi et al., "Interconnecting SS7 Signaling Networks," IEEE, pp. 0589-0593 (Copyright 1990).

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.2(4)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

* cited by examiner

METHODS AND SYSTEMS FOR ROUTING MESSAGES BETWEEN A MATED PAIR OF ROUTING NODES WITH A DISTRIBUTED PROCESSING ARCHITECTURE AND ONE OR MORE REDUNDANTLY CONNECTED REMOTE APPLICATIONS

RELATED APPLICATIONS

This application is a continuation-in-part of U.S. patent application Ser. No. 10/222,457, filed Aug. 16, 2002 now U.S. Pat. No. 7,136,477, which claims the benefit of U.S. Provisional Patent Application No. 60/312,984, filed Aug. 16, 2001, the disclosures of each of which are incorporated herein by reference in their entirety.

TECHNICAL FIELD

The present invention relates to methods and systems for providing SS7 support for one or more remote applications. More particularly, the present invention relates to methods and systems for routing messages between a mated pair of routing nodes with a distributed processing architecture and one or more redundantly connected remote applications.

BACKGROUND ART

Conventional telecommunications networks include two distinct communication pathways or subnetworks—a voice network and a signaling network. These two networks function in a cooperative manner to facilitate calls between users. As implied by its name, the voice network handles the transmission of voice (or user data) information between users. The signaling network has a number of responsibilities, which include call setup, call tear down, and database access features. In simple terms, the signaling network facilitates the dynamic linking together of a number of discrete voice-type communication circuits such that a voice-type connection is established between the calling and called party. Additionally, the signaling network provides a framework through which non-voice-related information may be transported, with this data and transport functionality being transparent to the users. The signaling protocol most commonly employed in communication networks around the world is the signaling system 7 (SS7) protocol.

From a hardware perspective, an SS7 network includes a number of SS7 nodes, generically referred to as signaling points (SPs), that are interconnected using signaling links, also referred to as SS7 links. At least three major types of SPs are provided in an SS7 network: service switching points (SSPs), signal transfer points (STPs), and service control points (SCPs). Within an SS7 signaling network, each SP is assigned an SS7 network address, which is referred to as a point code (PC).

An SSP is normally installed in Class 4 tandem or Class 5 end offices. The SSP is capable of supporting SS7 signaling operations. An SSP can be a customer switch, an end-office, an access tandem, and/or a tandem. An STP transfers signaling messages from one signaling link to another. STPs are packet switches and are generally installed as mated pairs for reliability and redundancy. Finally, SCPs host one or more databases, such as 800 number translation databases, 800 number carrier identification databases, credit card verification databases, home location registers, visitor location registers, mobile location servers, etc.

A simplified example of an SS7 signaling network is presented in FIG. 1. In FIG. 1, SS7 signaling network 10 includes a mated pair of STPs 12. Mated STP pair 12 includes an STP node 14 and an STP node 16, where STP node 14 is assigned an SS7 point code of 1-0-1 and STP node 16 is assigned a point code of 1-0-2. Network 10 also includes an SSP or end office (EO) 18. In conventional SS7 networks, each SS7 network element is assigned a point code that uniquely identifies each node within the context of the SS7 network. The point code that a node advertises to other nodes in the network for routing purposes is sometimes referred to as a true point code. In addition to the true point code, mated signal transfer points may be assigned an additional point code used to uniquely identify the pair. This shared point code is sometimes referred to as a capability point code (CPC). Accordingly, other network elements may send signaling messages to one mate of an STP pair using either the true point code associated with the individual node or the shared capability point code assigned to the mated pair. In either case, it should be noted that both the true point code and the CPC are public network addresses made available to other network elements in the PSTN for routing purposes. Thus, in FIG. 1, STPs 14 and 16 and end office 18 advertise separate public point codes to the PSTN.

As the convergence of traditional SS7 telecommunication signaling networks and traditional IP-centric data networks evolves, so will the tendency of network operators to place SSP end office node functionality within the data network or IP component of a converged network environment. That is to say, PSTN and wireless telephone network operators will likely find the economics of data network operation favorable to the placement of end office nodes within the data component of the converged network environment, as opposed to the traditional PSTN-SS7 network component. Such data network SSP-like network elements include media gateway (MG) and media gateway controller (MGC) or "softswitch" (SS) nodes, both of which are well known to those skilled in the art of Internet protocol (IP) telephony.

In a converged SS7-IP network environment, such SSP-like network nodes that would traditionally have resided within an SS7 signaling network and been assigned a unique SS7 network address (i.e., a point code) may now be located within an IP network and assigned a corresponding IP network address. However, in addition to IP addresses, such IP-based SSPs or end offices have also required SS7 point codes in order to be accessible to and inter-operable with other nodes in the SS7 network component. Consequently, network operators that choose to deploy IP-based signaling nodes (e.g., MGC/softswitch nodes) that also communicate with SS7 nodes have been faced with point code shortages because of the requirement that each SS7/IP node have its own point code in addition to an IP address.

One possible solution to the point code shortage problem between SS7 and IP networks is point code sharing, as described in commonly assigned, co-pending U.S. patent application Ser. No. 10/222,457, entitled Methods and Systems for Providing End Office Support in a Signaling Network (hereinafter, "the Parent Application"). The Parent Application discloses a routing node capable of sharing a point code with a remote application. The routing node utilizes an internal point code to distribute messages within the routing node. The remote application is not required to have its own separate point code. Rather, the remote application shares the point code of the routing node to which it is connected. Thus, the invention described in the Parent Application mitigates the point code usage problems. The Parent Application also describes a method for preventing failure of one remote application from disabling communications with another remote application.

Some commercially available signaling routers, such as SAVVI line of signaling products presented at www.radysys.com, are described as having the capability to communicate between SS7 and IP nodes. However, these products are not known to have a distributed architecture where SS7 routing data is distributed among multiple processors or cards. If routing between SS7 and IP nodes is handled by a single processor, the problem of routing messages between these nodes and performing network management on behalf of these nodes is greatly simplified because all messages are processed by the same processor. However, using a single processor to route and process all messages is undesirable for reliability and performance reasons. Accordingly, there exist a long felt need for methods and systems for routing messages within and between a mated pair of routing nodes with a distributed processing architecture and one or more redundantly connected remote applications.

DISCLOSURE OF THE INVENTION

The present invention includes methods and systems for providing routing and network management support for one or more remote applications using a mated pair of routing nodes with a distributed processing architecture. The distributed architecture of the mated pair of routing nodes may include multiple communications modules—some of which communicate with the PSTN, others of which communicate messages between the mated pair of routing nodes, and still others that communicate with the remote application.

In one example, distributing messages between and within the routing nodes and to the remote applications may include receiving a signaling message at a PSTN link interface module in a first routing node of a mated pair of routing nodes. The mated pair of routing nodes may be redundantly connected to one or more remote applications. The signaling message may be addressed to a public point code shared by the mated pair of routing nodes and the remote applications. The PSTN link interface module may determine, based on information in the signaling message, whether to forward the message to one of the remote applications or to the other node of the mated pair.

If the PSTN link interface module determines that the signaling message should be forwarded to one of the remote applications, the PSTN link interface module may replace the shared point code in the signaling message with a point code used internally by the routing nodes to identify the remote application. The PSTN link interface module may then distribute the message to a remote application link interface module using the internal point code. However, before sending the message to the remote application, the remote application link interface module preferably replaces the internal point code in the message with the true point code so that the remote application is only required to recognize the true point code.

If the PSTN link interface module determines that the signaling message should be forwarded to the other routing node of the mated pair, the PSTN link interface module may replace the shared point code with another point code used internally by the receiving routing node to identify the other routing node of the mated pair. The PSTN link interface module may then distribute the signaling message to a link interface module associated with the other routing node based on the internal point code used to identify the other routing node. Before sending the messages to the other routing node, the link interface module may replace the OPC value in the message with a point code used by the other routing node to identify the receiving routing node.

If the PSTN link interface module determines that the message is not intended for the other routing node or the remote application, the PSTN link interface module may route the message to another link interface module associated with the destination node. In this instance, no point code replacement is required.

Thus, a mated pair of routing nodes according to the present invention is capable of using one public point code when communicating with the PSTN, using private point codes when communicating messages between each other when the messages are intended for each other, and using additional private point codes when communicating messages between each other when the messages are intended for a remote application. Such multiple point code awareness enables the routing nodes of the present invention to be transparent to PSTN nodes while supporting multiple remote applications. In addition, because message distribution is based on point codes, the routing nodes of the present invention can leverage MTP3 routing functionality to distribute messages to the appropriate internal and external destinations.

Another aspect of the invention involves the capability of the mated pair of routing nodes to function in normal STP mode when receiving messages from one network and in remote application support mode when receiving messages from another network. Normal STP functionality may include routing messages based on the DPC in each received message and performing global title translation for messages requiring such translation. Remote application support mode may include the complex point-code-replacement and routing scenarios discussed above and performing network management on behalf of the remote application. This dual functionality enables routing nodes of the present invention to replace conventional STPs and simultaneously add the support for one or more remote applications.

The functions for providing conventional STP functionality and remote application support are described herein as modules, applications, or processes. It is understood that these modules, applications, or processes may be implemented as computer-executable instructions embodied in a computer-readable medium. Alternatively, the modules, applications, or processes described herein may be implemented entirely in hardware. In yet another alternative embodiment, the modules, applications, or processes described herein may be implemented as a combination of hardware and software.

Furthermore, the modules, applications, and processes for providing normal STP and remote application support are described below as being associated with cards or subsystems within an STP or signaling gateway routing node. It is understood that these cards or subsystems include hardware for storing and executing the processes and modules. For example, each card or subsystem described below may include one or more microprocessors, such as an x86 microprocessor available from Intel Corporation, and associated memory.

Accordingly, it is an object of the present invention to provide a mated pair of routing nodes for sharing an SS7 point code with and providing SS7 MTP routing and network management functionality on behalf of one or more remote applications.

It is another object of the invention to provide a mated pair of routing nodes that advertise a public point code to the PSTN, use private point codes to identify each other, and use another set of private point codes to internally identify remote applications.

It is another object of the present invention to provide a mated pair of routing nodes capable of functioning in STP mode and in remote application support mode.

Some of the objects of the invention having been stated hereinabove, other objects will become evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings, of which.

DETAILED DESCRIPTION OF THE INVENTION

Figure 1:
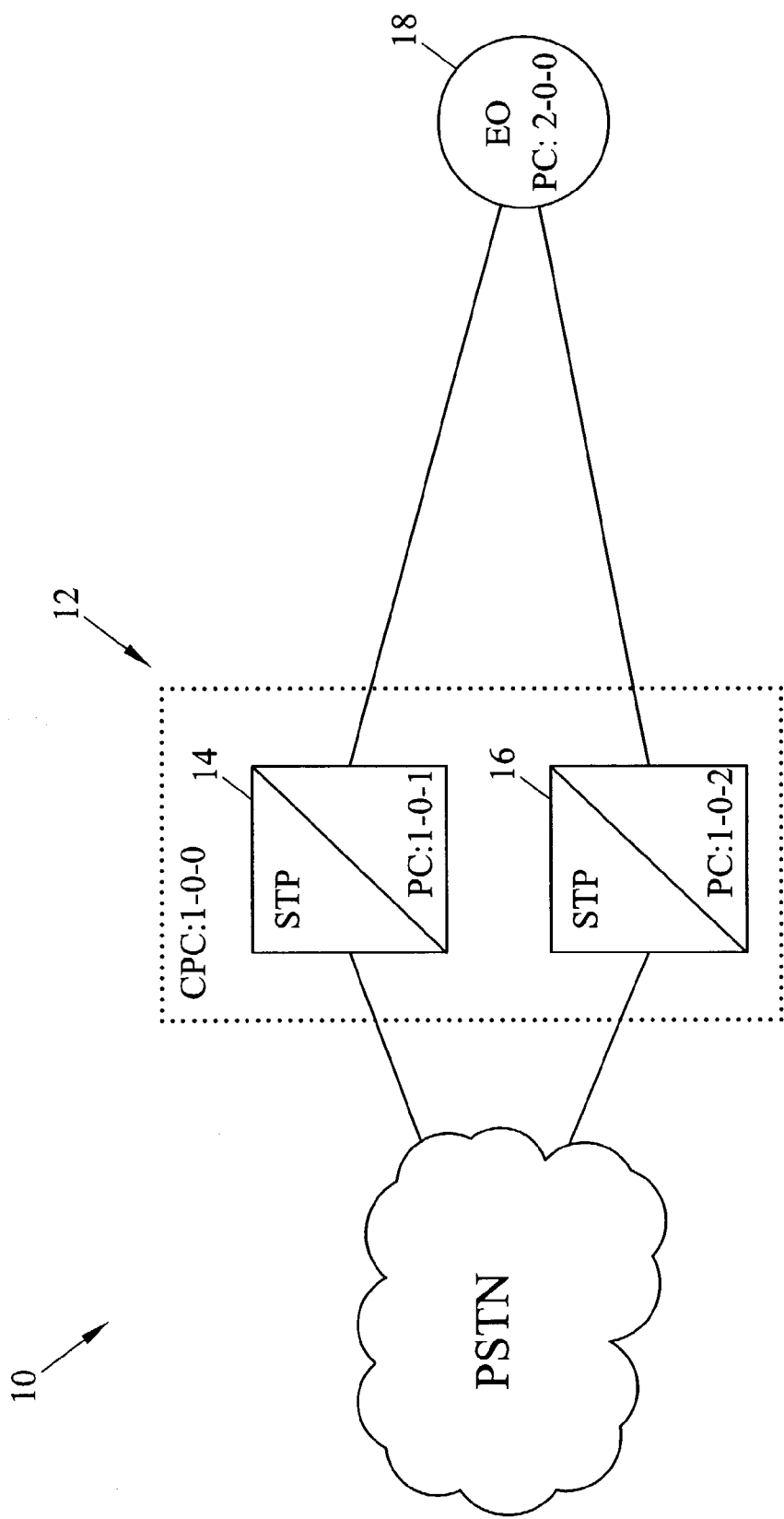
FIG. 1 is a network diagram illustrating a conventional signaling system 7 (SS7) signaling network environment including a mated pair of signal transfer points.
Figure 2:
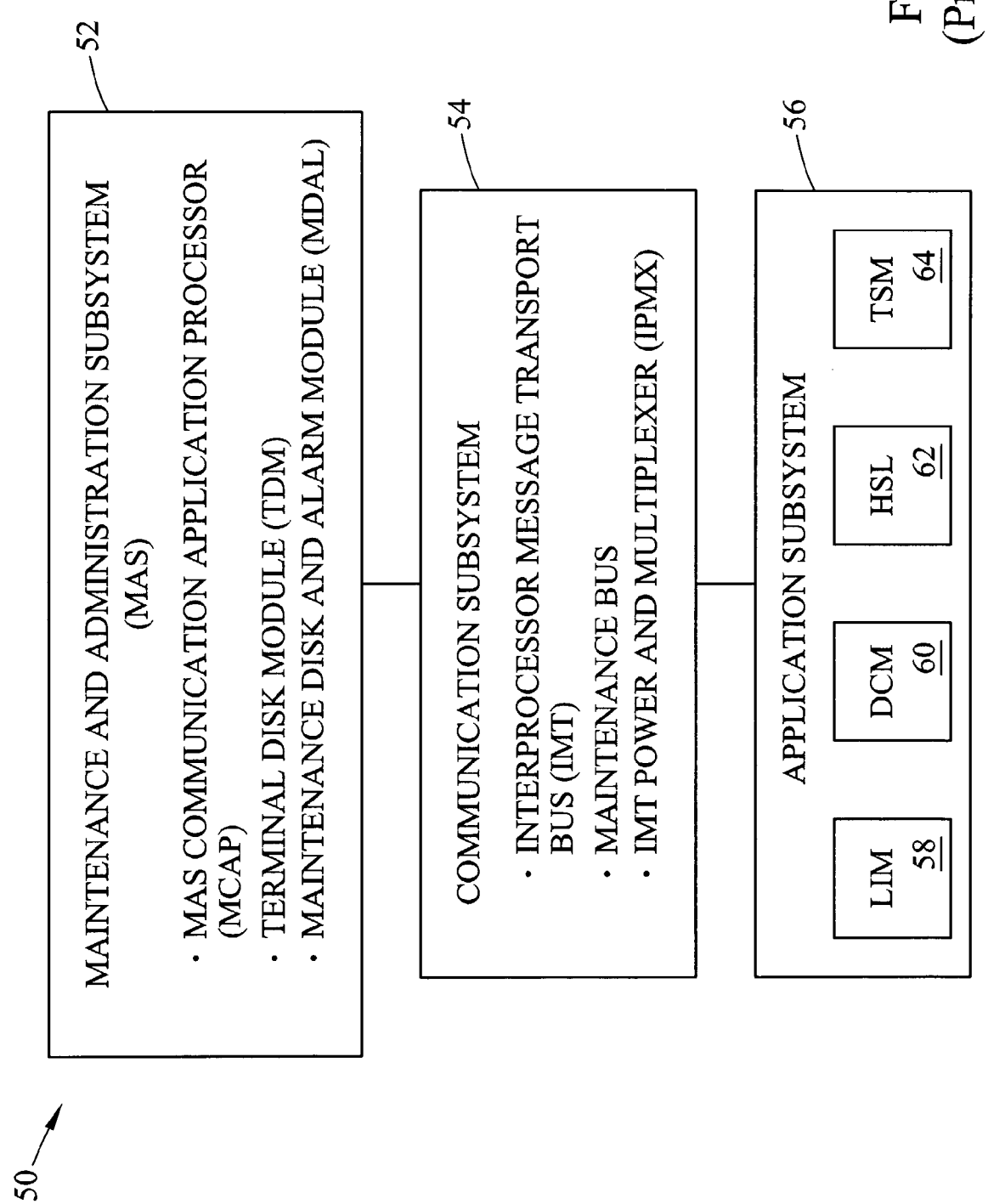
FIG. 2 is a block diagram of a gateway routing node architecture suitable for use with embodiments of the present invention.

Embodiments of the present invention may include an underlying hardware platform similar to a SS7 signal transfer point (STP) or signaling gateway (SG) routing node. Exemplary STP or SG hardware platforms suitable for use with embodiments of the present invention include the EAGLE® STP and the IP⁷Secure Gateway™, both available from Tekelec of Calabasas, California. A block diagram that generally illustrates the base internal architecture of an IP⁷ Secure Gateway™ is shown in FIG. 2. In FIG. 2, SG routing node 50 includes the following subsystems: a maintenance and administration subsystem (MAS) 52; a communication subsystem 54 and an application subsystem 56. MAS 52 provides maintenance communications, initial program loading, peripheral services, alarm processing and system disks. Communication subsystem 54 includes an interprocessor message transport (IMT) bus that is the main communication bus among all subsystems in SG routing node 50. The IMT bus includes two 1 Gbps counter-rotating serial rings.

Application subsystem 56 includes application cards capable of communicating with the other cards through the IMT bus. Numerous types of application cards can be incorporated into SG 50, including: a link interface module (LIM) 58 that interfaces with SS7 links; a data communication module (DCM) 60 that provides an Internet protocol (IP) interface using transmission control protocol (TCP) or stream control transmission protocol (SCTP); and a high-speed link interface module (HSL) 62 that provides an interface to asynchronous transfer mode (ATM) signaling links. A translation service module (TSM) 64 may also be provided to support global title translation, gateway screening and other translation services, such as number portability service.

Routing Node Architecture

Figure 3:
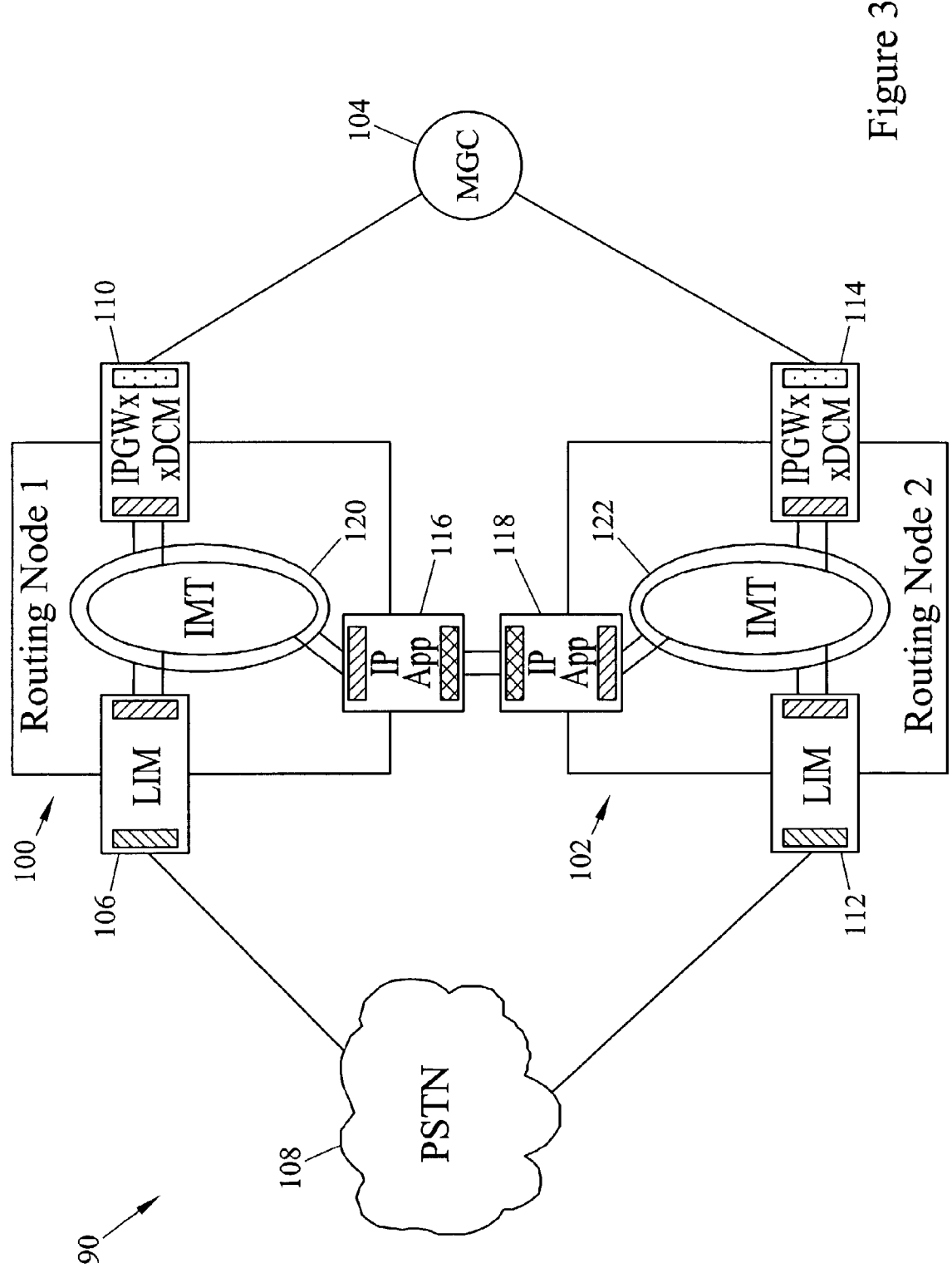
FIG. 3 is a network diagram illustrating a mated pair of routing nodes and a redundantly connected remote application according to an embodiment of the present invention.

FIG. 3 illustrates an exemplary signaling network environment, generally indicated by reference numeral 90. In FIG. 3, network 90 includes a mated pair of routing nodes 100 and 102 and a redundantly connected remote application 104. Routing node 100 includes an SS7 LIM 106 that interfaces with PSTN 108 using the SS7 message transfer part (MTP) protocol. Routing node 100 also includes an IP-capable DCM card 110 for communicating with remote end office application 104 using an IP-based signaling protocol, such as SS7 over IP, SIP over IP, MGCP over IP, or H.323 over IP. Routing node 102 includes an SS7 LIM card 112 for communicating with other nodes in PSTN 108 using the SS7 MTP protocol. Routing node 102 also includes an IP-capable DCM card 114 for communicating with the remote end office application 104.

Routing nodes 100 and 102 are coupled to each other via mate signaling link interface modules 116 and 118. These mate signaling link interface modules may be provided by an appropriately provisioned SS7 LIM module or IP-capable DCM module, such as those described above. According to the present embodiment, mate signaling link interface functionality may be provided by an IP-capable DCM module.

Within the context of the SS7 protocol, the signaling link interface modules described herein may terminate one or more individual signaling links that together form a signaling linkset. For example, an SS7 link interface module may terminate one or more dedicated 56 kbit/sec signaling link channels (e.g., DS0 channels) that make up an SS7 linkset, while an IP-capable DCM module may terminate one or more TCP connections or SCTP associations that make up an IP linkset. In the later case, one or more virtual SS7 signaling link channels may be mapped onto the IP linkset.

Within each routing node, communication between provisioned link interface modules (e.g., LIMs, DCMs, etc.), maintenance and administration processors, and other processing modules may be accomplished via a high-speed interprocessor message transport (IMT) communications bus. The IMT bus may include a pair of counter-rotating rings. Each module may be assigned a time slot for communicating on the rings. Alternatively, the IMT bus may be implemented using a CSMA protocol, such as Ethernet. The IMT bus is identified in routing node 100 by reference numeral 120 and in routing node 102 by reference numeral 122. The distributed, multi-processor architecture of a routing node according to the present invention facilitates the deployment of multiple LIM, DCM and other application processor cards, all of which may be simultaneously connected to and communicating via an IMT bus.

From a hardware perspective, LIM 106, DCM 110, and mate signaling link interface 114 may each include a printed circuit board physically connected to IMT bus 120. Each printed circuit board may include a communication processor programmed to send and receive messages via IMT bus 120. Each printed circuit board may also include an application processor programmed to perform various functions. For example, the application processor of DCM 110 may be programmed to perform the functions described herein for providing SS7 MTP routing and network management functions on behalf of a remote application residing in an IP network.

One function of routing nodes 100 and 102 illustrated in FIG. 3 is the receipt of a signaling message by a PSTN-interfacing LIM and the internal processing and routing of this message to a DCM for transmission to a redundantly-connected remote application. Since routing nodes 100 and 102 share a self-identifying true point code (TPC) with a remote application, such as MGC 104, routing messages addressed to the shared point code and performing network management functions for that interconnect these nodes are important aspects of the invention.

In one embodiment of the present invention, inter-mate communication is accomplished through the use of unique, private point code (PPC) values that are assigned to each of the routing nodes. The PPC values are assigned to each routing node in addition to the public, shared TPC, and the PPC values are private to the mated routing nodes. The PPC values are unique in that each routing node has its own private point code, and the private point codes are different from the internal point codes used within each routing node to internally distribute messages destined for remote applications. However, like the internal point codes used by the routing nodes to identify remote applications, the private point code values are private in that they preferably are not included in messages sent to PSTN nodes. Exemplary hardware and software for providing inter-mate communication using private point codes will be described in detail below.

Link Interface Module (LIM) Architecture

Figure 4:
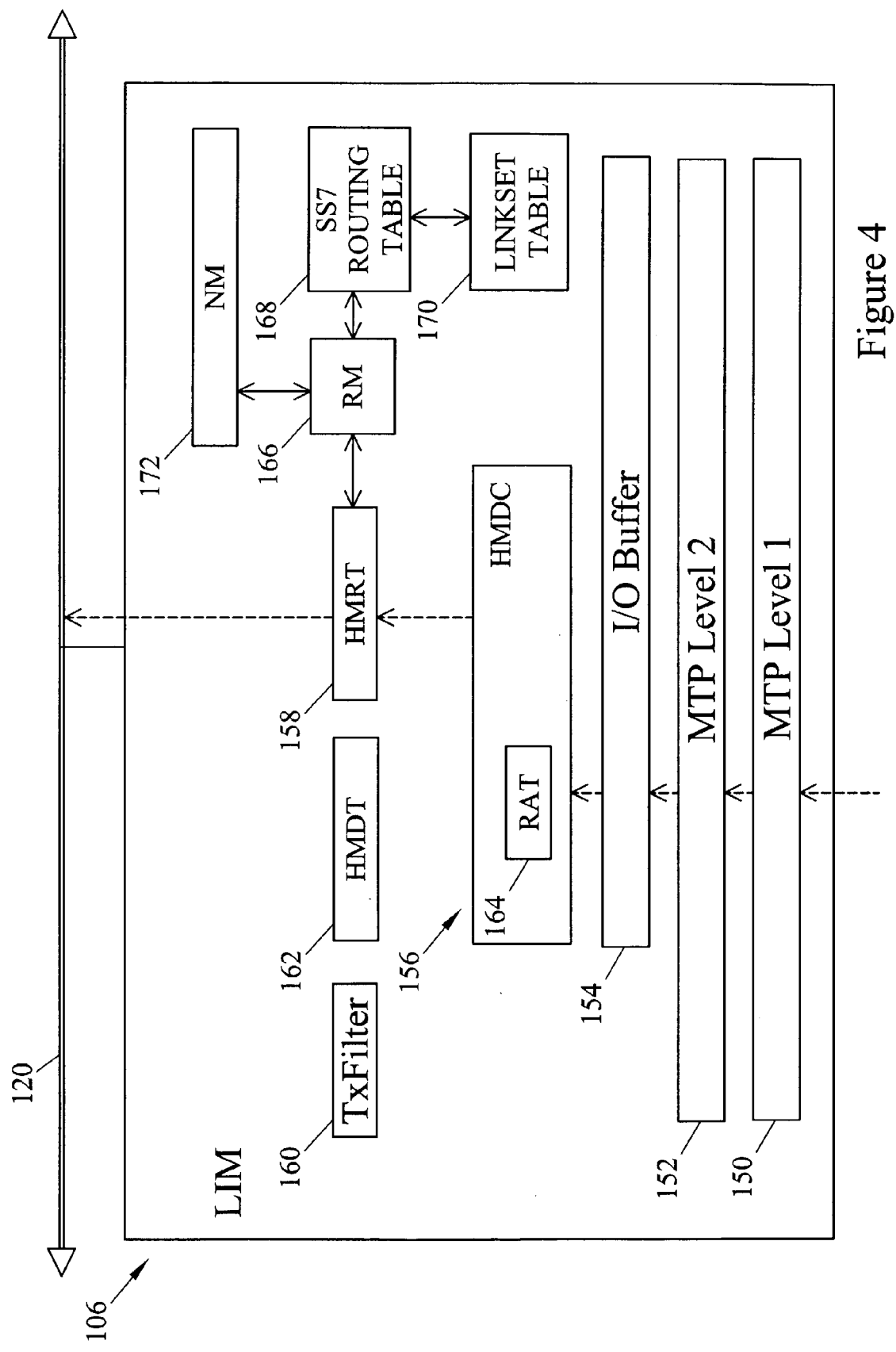
FIG. 4 is a block diagram of an SS7 link interface module (LIM) illustrating message flow associated with the an inbound signaling message according to an embodiment of the present invention.

FIG. 4 illustrates an exemplary LIM architecture according to an embodiment of the present invention. Referring to FIG. 4, LIM 104 may have a number of sub-components, including an SS7 MTP level 1 process 150, an SS7 MTP level 2 process 152, an I/O buffer 154, a message handling and discrimination (HMDC) process 156, a message handling and routing (HMRT) process 158, a transmit filter 160 for processing outbound signaling messages, and a message handling and distribution (HMDT) process 162. MTP level 1 process 150 may provide the facilities necessary to send and receive digital data over a particular physical medium/physical interface (e.g., DS0, T1, E1, OC-3, etc.). Working in conjunction with the MTP level 1 process 150, MTP level 2 process 152 provides for error detection, error correction and sequenced delivery of SS7 message packets. I/O buffer 154 provides for temporary buffering of incoming and outgoing SS7 signaling message packets.

HMDC process 156 receives signaling messages from the lower processing layers and performs a discrimination function, effectively determining whether an incoming SS7 message packet requires internal processing or is simply to be through switched. Such discrimination may include the examination of a destination point code (DPC) parameter contained within a received signaling message. In one embodiment of the present invention, HMDC process 156 may access a remote application table (RAT) 164 for processing inbound messages as indicated in FIG. 4. Remote application table 164 may include data that allows HMDC process 156 to determine whether a message should be internally processed or through switched. HMDC process 156 may perform a lookup in remote application table 164 based on the DPC and one or more additional parameters in a received signaling message. If no match is found in remote application table 164, HMDC process 156 may determine that the message is to be through switched. However, if a match is found in remote application table 164, HMDC process 156 may replace the destination point code in the message with a private point code and forward the message for distribution based on the private point code.

Table 1 shown below is an example of a remote application table that may be used by a routing node according to an embodiment of the present invention. In Table 1, each entry includes a network type identifier field, a shared true point code identifier field, a signaling identifier (SI) field, an internal point code (IPC) identifier field, a SCCP subsystem (SSN) field a CIC start (CICS) field, and a CIC end field (CICE). The network type field identifies the network type of the signaling message. The shared true point code field stores point codes shared by the mated pair of routing nodes and one or more remote applications. The SI field stores SI values used in combination with the true point code to identify a particular remote application among multiple remote applications to which a signaling message should be routed. The internal point code field stores private point code values used internally by the mated pair of routing nodes to identify the remote applications. In the illustrated example, multiple unique internal point codes are present. In a preferred embodiment of the invention, one unique internal point code is assigned to each remote application. However, multiple unique IPC values may be assigned to each remote application without departing from the scope of the invention. The CICS and CICE fields identify ranges of CIC values assigned to a remote application, such as an end office.

TABLE 1

Remote Application Table

| Network | TPC | SI | SSN | OPC | CICS | CICE | IPC |
|---------|-----|-----|------|-----|------|------|--------|
| ANSI | 1-1-1 | 5 | all | | 0 | 16383 | 9-9-9 |
| ANSI | 1-1-1 | 3 | all | all | | | 9-9-10 |
| ANSI | 1-1-1 | 12 | 5-5-5 | | | | 9-9-11 |
| ITUN | 100 | 5 | all | 0 | 100 | 1000 | |
| ITUN | 100 | 5 | all | 101 | 200 | 1001 | |

One parameter that may be used to index Table 1 is a network type identifier. A network type identifier may indicate the type of network from which a signaling message is received. Such a network type indicator may be determined directly or indirectly from parameters in a received signaling message. Examples of network types encountered in an SS7 signaling environment include American National Standards Institute (ANSI), International Telecommunications Union-National (ITU-N), and International Telecommunications Union-International (ITU-I). The service indicator (SI) field in the remote application table includes values that correspond to SI parameter values contained in the MTP routing label of a received SS7 message.

As illustrated above, some entries in Table 1 include an internal point code value. An IPC value may be an SS7 point code used to distribute messages within routing node 100 when the messages are destined for a remote application. An IPC may be assigned to a received signaling message on a temporary basis and removed from the message before the message leaves the routing node. The present invention is not limited to using internal point codes to distribute messages within a routing node. Any suitable value that is temporarily assigned to the message for internal distribution of the message may be used without departing from the scope of the invention.

Transmit filter 160 examines outbound signaling messages and discards messages having a DPC value or a concerned point code (CPC) value that is equal to an internal point code. An IPC may be temporarily inserted into the DPC of a message for internal distribution purposes. Similarly, a network management message may include a CPC value (that identifies the point code that the network management message concerns) equal to the IPC of routing node 100. Since LIM 106 interfaces with PSTN 108, outbound message addressed to or that concern the IPC should not be allowed to leave routing node 100 via LIM 106. Accordingly, transmit filter 160 preferably discards these messages.

In the case where an outbound message is addressed from an IPC value (i.e., OPC=IPC), transmit filter 160 may replace the IPC value in the OPC field of the message with the true or public point code address of the mated routing nodes prior to transmission into the PSTN. Furthermore, transmit filter 160 may discard any outbound message having a CPC value that is equal to the node's PPC or its mate's PPC. Transmit filter 160 may also screen outbound messages and selectively prevent certain network management messages from being transmitted. Such functionality may be needed when a network management event is generated by one remote application that shares the point code of a routing node but not another remote application that shares the same point code. In this case, transmit filter 160 may prevent certain network management messages from entering the network. This reduces the likelihood that network management messages generated on behalf of one remote application will affect communications with any other supported remote application.

Table 2 shown below illustrates exemplary signaling network management (SNM) processing rules employed by a routing node according to the present invention. The sample SNM processing rules in Table 2 include an SNM category, an SNM message type, a general processing description, and generating entity comments. The SNM category field indicates the category of the network management message. The SNM message type field indicates the network management messages within each category. The action field identifies the action taken by routing node 100 for each network management message category. The generating entity field identifies the node that generates the network management messages. Those skilled in the art of SS7 communications will appreciate that the message categories and types are well known in the telecommunications industry, and, as such, a detailed discussion of each SNM message is not presented herein. A comprehensive discussion of SS7 network management messages and related issues can be found in *Signaling System #7* by Travis Russell, McGraw-Hill Publishing 1998.

TABLE 2

Routing Node Signaling Network Management Processing Rules

| SNM Category | SNM Message Type | Action When Received | Generating Entity |
|---|---|---|---|
| CHM | COO COA XCO XCA CBD CBA | Processed as for TPC. Not forwarded to remote application. | Generated by routing node on behalf of remote application. |
| DLM | DLC CSS CNS CNP | Processed as for TPC. Not forwarded to remote application. | Generated by routing node on behalf of remote application. |
| ECM | ECO ECA | Processed as for TPC. Not forwarded to remote application. | Generated by routing node on behalf of remote application. |
| FCM | RCT | The routing node abates congestion on behalf of the remote application. Processed as for TPC. Not forwarded to remote application. | Generated by routing node on behalf of remote application. A remote application can generate using MTPP, but this behavior is not recommended, since this results in excessive RCTs (sent by both routing node and remote application). |
|  | TFC | The routing node abates congestion on behalf of the remote application. Processed as for TPC. Replicated to remote application using MTPP. | Generated by routing node on behalf of remote application. |
| MIM | LIN LUN LIA LUA LID LFU LLI LRI | Processed as for TPC. Not forwarded to remote application. | Generated by routing node on behalf of remote application. |
| RSM | RSP RSR RCP RCR | Processed as for TPC. Not forwarded to remote application. | Generated by routing node on behalf of remote application. |
| TFM | TFP TCP TFA TCA TFR TCR | Processed as for TPC and replicated to remote application using MTP Primitive (MTPP). | If concerning remote application, then generated internally by routing node on behalf of remote application, but not transmitted. If not concerning remote application, then generated and transmitted as usual. |
| TRM | TRA TRW | Processed as for TPC. Not forwarded to remote application. | Generated by routing node on behalf of remote application. |
| UFC | UPU | Forwarded to remote application if concerned SI is assigned, otherwise processed as for TPC. | May be generated by routing node or by remote application. |

As illustrated in Table 2, routing node 100 performs many network management functions on behalf of a remote application. As a result, remote application design is simplified. Processing examples for some of the network management messages illustrated in Table 2 will be described in detail below. However, detailed processing examples are not repeated for all of the types of messages in Table 2.

In certain cases, a network management message may contain information that is of interest to a remote SS7 level 4 application. That is, it may be desirable to replicate some or all of the information contained in an SNM message and distribute that information internally within a routing node as well as to a remote application. Certain SNM messages may specify information associated with an "affected" or "concerned" network element, destination or application, including a concerned point code (CPC) and concerned signaling indicator (CSI) parameter. Such identifying information may also be used by routing nodes of the present invention to determine how to process and/or route a signaling message addressed to a point code shared by the routing nodes and one or more remote applications. Specific examples of such processing will be described in detail below.

Returning to a discussion of LIM 106, HMDT process 162 performs internal distribution of SS7 message packets received from discrimination process 156 that are destined for a locally provisioned subsystem such as a flexible numbering, number portability, or global title translation subsystem. HMRT process 158 may receive a message from discrimination process 156 and route the message to an appropriate communication module. Such routing is performed by HMRT process 158 using routing data maintained by a routing manager 166 in a routing table 168 and a linkset table 170.

Data structures 168 and 170 contain signaling route and signaling route status information, along with internal IMT bus routing information. Table 3 shown below illustrates an exemplary structure and associated data for the SS7 routing table 168.

TABLE 3

SS7 Routing Data

| DPC | Route Cost | Linkset Status | Adjacent Status | Overall Status | Linkset Name | Linkset Type |
|---|---|---|---|---|---|---|
| 9-9-9 | 10 | A | A | A | LS_M1MGC | RA |
| 9-9-9 | 20 | P | A | P | LS_MATE | MATE |
| 9-9-2 | 10 | A | A | A | LS_MATE | MATE |
| 1-0-0 | 10 | A | P | P | LS4 | STD |
| 1-1-2 | 10 | A | A | A | LS5 | STD |
| 1-1-2 | 20 | A | A | A | LS6 | STD |
| 2-0-0 | 10 | A | A | A | LS7 | STD |
| 2-0-0 | 20 | A | A | A | LS8 | STD |
| 2-0-1 | 10 | A | A | A | LS9 | STD |
| 2-0-1 | 20 | A | A | A | LS10 | STD |
| 2-2-3 | 10 | A | A | A | LS11 | STD |
| 2-2-3 | 20 | A | A | A | LS12 | STD |

In Table 3, the routing data includes a destination point code (DPC) key field, which may be used to index the table. In an alternate embodiment of the invention, multiple DPC key fields, each corresponding to a different signaling protocol point code addressing scheme, may be included in routing table 168. For example, one DPC key field may be used to accommodate an ANSI point code format. Another DPC key field may be used to accommodate an ITU-I point code format. Yet another DPC field may store an ITU-N point code format. ITU national and international signaling protocols utilize a 14-bit point code; while the ANSI signaling protocol employs a 24-bit point code-addressing scheme. However, for simplicity of illustration, only ANSI-formatted DPC values are shown in Table 3.

In addition to the DPC field, Table 3 includes a route cost field, a linkset status field, an adjacent node status field, an overall status field, a linkset identifier or pointer field, and a secondary point code field. The route cost field includes a value that indicates the relative cost associated with the route. The linkset status field includes an identifier or value that indicates the status of the signaling link associated with the particular DPC value. The adjacent status field stores values or identifiers that indicate whether or not the linkset associated with an adjacent node is available. The overall status field stores values that indicate whether or not a linkset or an adjacent linkset is available. The linkset name field stores an identifier or value of the linkset associated with a particular destination point code, while an associated linkset type field stores an identifier which indicates whether the linkset is associated with a remote application (i.e., "RA") or a mate routing node (i.e., "MATE"). In the example illustrated in Table 3, linksets that are not designated "RA" or "MATE" are considered to be standard (STD), meaning that these linksets are connected to a node other than a mate or a remote IP application. However, any number of linkset type designations may be employed to further discriminate between linksets.

Table 4 shown below illustrates an exemplary linkset data structure that may be used routing node 100 when interconnected with its mate and with a remote application in the manner described below with respect to FIG. 6.

TABLE 4

Linkset Data

| KEY(s) | | DATA FIELDS | | | |
|---|---|---|---|---|---|
| Linkset Name | Link | IMT/Card Address | Port | Link Status | Adjacent Point Code |
| LS_M1MGC | 0 | 1305 | A | A | 9-9-9 |
| LS_M1MGC | 1 | 1307 | B | P | 9-9-9 |
| LS_MATE | 0 | 1505 | B | A | 9-9-2 |
| LS_MATE | 1 | 2300 | A | A | 9-9-2 |
| LS5 | 0 | 3301 | A | A | 1-1-2 |
| LS5 | 1 | 3312 | B | A | 1-1-2 |
| LS11 | 0 | 1105 | A | A | 2-2-3 |
| LS11 | 1 | 1205 | A | A | 2-2-3 |

Table 4 may be accessed using a compound key including a linkset identifier and a signaling link. Table 4 includes IMT bus address and port fields that store IMT bus address and communication port information associated with communication modules that are connected to IMT bus 120. More particularly, a record in the linkset table includes an IMT address and communication port value associated with a communication module that supports the specific link identified in the record key. For example, as shown in Table 4, link 0 of linkset 1 resides on a communication module that has an IMT bus address of 1305 and a communication port address of "A." The link status field for this entry indicates that link 0 of linkset 1 is available for service. Table 4 also includes an adjacent point code field that contains information that identifies the signaling node that is connected at the distant end of a signaling link. In the illustrated example, because remote application 104 is represented internally by the IPC value of 9-9-9, the adjacent point code value specified for links 0 and 1 of linkset LS_M1MGC is 9-9-9. Similarly, for links 0 and 1 of linkset LS_MATE, the adjacent point code is 9-9-2 because 9-9-2 is the private point code that routing node 100 uses to communicate with routing node 102 on signaling link 0 of linkset LS_MATE.

Although in Tables 3 and 4 above, the linkset type and linkset status information are stored in separate tables, the present invention is not limited to such an embodiment. In an alternate embodiment of the invention, the linkset type and status information may be stored in the same table.

The SS7 routing table returns an index value or pointer that is used in a second database lookup the linkset table. The ultimate result of this two-stage lookup procedure is an IMT bus address and communications port associated with a signaling link on a communication module. The present invention is not limited to the data structures illustrated in Tables 3 and 4 for routing received messages. Any data structure that takes a destination point code maps the point code to a linkset and a signaling link may be employed. In addition, LIM 106 illustrated in FIG. 4 may include applications and databases other than those shown. The functionality illustrated in FIG. 4 is merely intended to illustrate the components of LIM 106 that may be used to provide mated remote application support and the associated routing and distribution functionality according to embodiments of the present invention.

Routing manager 166 may perform a number of functions including the administration of routing data within the SS7 routing and linkset tables 168 and 170, respectively. Such administration may be accomplished through interactions with network management (NM) function 172. Network management function 172 receives, processes, and generates network management information. Network management function 172 may also notify other communication modules (e.g., LIMs, DCMs, etc.) within routing node 100 of changes in the status of links and other nodes in the SS7 network. Network management function 172 may also convey network management information to routing node 102 and to other nodes by formulating network management messages, such as those described above in Table 2. In one embodiment of the present invention, routing manager 166 may receive an SS7 network management message, use information contained within the message to update route status information in SS7 routing table 168 and linkset table 170, and distribute the network management information to other communication modules connected to IMT bus 120.

Data Communication Module Architecture

Figure 5:
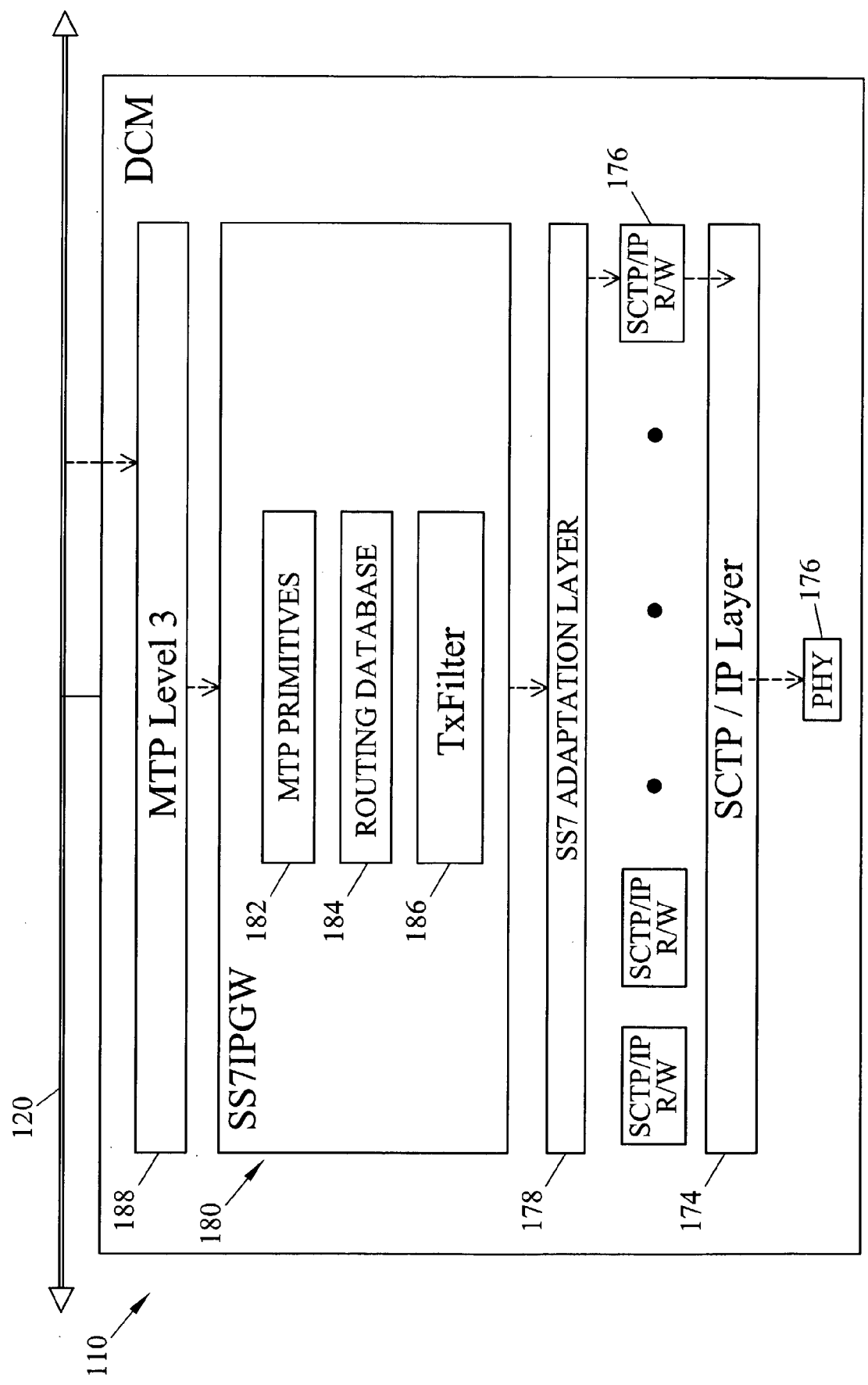
FIG. 5 is a block diagram of an Internet protocol capable data communication module (DCM) according to an embodiment of the present invention.

FIG. 5 illustrates a data communication module according to an embodiment of the present invention. In FIG. 5, DCM 110 may be used to provide the communication interface between a routing node and a remote application, between routing nodes and between a routing node and any external node capable of sending and receiving SS7 messages over an IP network. For example, any of the communications modules illustrated in FIG. 3 may be an IP-capable DCM.

As indicated in FIG. 5, DCM 110 is connected to IMT communication bus 120 and includes a number of functional processes. These processes include a physical layer 173 for performing physical layer functions and a stream control transmission protocol/Internet protocol (SCTP/IP) layer 174 for performing SCTP/IP protocol functions associated with up to 16 SCTP/IP associations. DCM 110 also includes a plurality of SCTP/IP read/write processes for buffering and performing basic input/output (I/O) type operations for each association. In the example presented in FIG. 5, a typical SCTP/IP read/write process is specifically identified as SCTP/IP 15 R/W process 176. Also included on DCM 110 is an SS7 adaptation layer 178 for adding/removing appropriate header information to outgoing/incoming message packets, and an SS7IPGW application layer 180 for processing both inbound and outbound signaling messages. Functions or layers 178 and 180 may support any number of SS7 signaling adaptation protocols, such as Tekelec's transport adapter layer interface (TALI), M2PA, M3UA, M2UA, SUA, or other adaptation layer protocol, as described in the correspondingly named IETF Internet Drafts and RFCs. In the example shown in FIG. 5, SS7IPGW application layer 180 includes an SS7 MTP primitives function 182 for performing adaptation translation processing, a routing database 184, and a mate point code/internal point code transmit filter function 186.

In one embodiment, MTP primitives function 182 may facilitate the mapping or translation of SS7-MTP formatted signaling messages into SIGTRAN formatted signaling messages (e.g., M2PA, M3UA, M2UA, SUA, etc.), and vice-versa. Such mapping functionality may be applied to both network management messages and user part messages. The present invention is not limited to the above referenced SS7 adaptation layer protocols. Other functionally similar SS7 adaptation layer protocols may be employed without departing from the scope of the invention.

Routing database 168 may include a routing key table and an IP connection table. A sample routing key table is presented below in Table 5. Table 5 includes a plurality of fields that may be used together as routing keys. In this example, the routing key fields include a destination point code field, a service indicator field, a subsystem number field, an origination point code field, a circuit identification code start field, and a circuit identification code end field. Two IP connection identifiers (i.e., sname0 and sname1) are associated with each entry in Table 5. The IP connection identifiers may identify a TCP socket or an SCTP association. Either IP connection identifier in each entry in Table 5 may be used as an index to a particular entry in the IP connection (Table 6).

TABLE 5

Routing Key Table

| DPC | SI | SSN | OPC | CICS | CICE | sname0 | sname1 |
|---|---|---|---|---|---|---|---|
| 9-1-1 | 3 | 5 | | | | dcm1305s1 | dcm1307s1 |
| 9-9-9 | 5 | | 1-1-1 | 0 | 16383 | dcm1305s1 | dcm1307s1 |
| 9-9-9 | 5 | | 1-1-2 | 0 | 16383 | dcm1305s1 | dcm1307s1 |
| 9-9-9 | 5 | | 3-1-2 | 0 | 16383 | dcm1305s1 | dcm1307s1 |
| 3-1-2 | 3 | 5 | | | | dcm1305s2 | dcm1307s2 |
| 3-1-2 | 5 | | 1-1-1 | 0 | 16383 | dcm1305s2 | dcm1307s2 |
| 3-1-2 | 5 | | 1-1-2 | 0 | 16383 | dcm1305s2 | dcm1307s2 |
| 3-1-2 | 5 | | 3-1-1 | 0 | 16383 | dcm1305s2 | dcm1307s2 |

Routing keys, such as those described above, are commonly employed in SS7 routing nodes (e.g., SGs and STPs) to determine how and where a signaling message should be routed. Many different combinations of signaling message parameters may be used to form a routing key, and, as such, the particular structure presented in Table 5 is simply one of many possible routing key table structures. Table 6 shown below illustrates exemplary data that may be used by DCM 110 to maintain IP connection status.

TABLE 6

IP Connection Table

| Sname | Lhost | Lport | Rhost | Rport | Status |
|---|---|---|---|---|---|
| dcm1305s1 | dcm1305a | 5000 | Hostp | 5000 | ok |
| dcm1305s2 | dcm1305a | 5001 | Hostq | 5001 | ok |

TABLE 6-continued

IP Connection Table

| Sname | Lhost | Lport | Rhost | Rport | Status |
|---|---|---|---|---|---|
| dcm1307s1 | dcm1307a | 7000 | Hostp | 7000 | ok |
| dcm1307s2 | dcm1307a | 7001 | Hostq | 7001 | ok |

As indicated in Table 6, an IP connection table may be indexed by an IP connection identifier, where each identifier identifies an IP connection, such as an SCTP association or a TCP socket, with a remote endpoint. Each entry in the IP connection table also includes a connection status parameter, which indicates the availability of each connection defined in the table. Using the routing information contained in Table 5 and 6, an outbound signaling message may be directed to an appropriate IP connection for transmission into an associated IP network.

In FIG. 5, DCM 110 also includes a message transfer part level 3 process 188. MTP level 3 process 188 may perform SS7 MTP level 3 routing and network management functions on behalf of one or more redundantly connected remote applications that implement higher SS7 layers. These functions will be described in more detail below.

The database structures and tables described above are merely illustrative of the types of data that can be employed to provide the functionality of a DCM in a routing node according to an embodiment of the present invention. The messages received and transmitted by a DCM card may include SS7 messages, SIP messages, H.323 messages or other signaling protocol messages that may be transported via TALI over TCP/IP, SXUA or MXUA over SCTP, or similar transport level protocols.

Transmit Filter Functions

As illustrated in FIGS. 4 and 5, both LIM 106 and DCM 110 include a transmit filter. However, the functionality of the transmit filter depends on the location of the LIM or DCM in the overall system. For example, referring again to FIG. 3, DCMs 116 and 118 for inter-mate communications may include different transmit filter functions from LIMS 106 and 112 that interface with the PSTN and DCMs 110 and 114 that interface with remote application 104. Filter rules for each communications module location will now be described in detail. For communications modules between routing nodes, such as communications modules 116 and 118, exemplary transmit filter conversion rules are as follows:

(1) If DPC equals IPC, then replace DPC with mate IPC (if unique IPCs are supported, otherwise no action).
(2) If OPC equals TPC, then replace OPC with PPC (uniquely identifies the originator of the message within the triumvirate of the routing nodes and the remote application).
(3) If CPC equals IPC, then replace CPC with mate IPC (if unique IPCs are supported, otherwise no action).

Rule 1 relates to messages sent from one routing node of a mated pair to the other routing node of the mated pair, where the message is intended for a remote application, and the other routing node may use a different IPC to identify the remote application. If such a message is received by the transmit filter on a communications module to be sent to the mate routing node, the DPC is preferably changed to the IPC that the mate uses to identify the remote application. Rule 2 relates to the case when messages from a mate routing node are intended to be sent to the other mate routing node and the OPC in the message is equal to the true point code shared between the routing nodes and the remote application. In this instance, the transmit filter on the communications module preferably changes the originating point code in the message from the true point code to the private point code that uniquely identifies the sending routing node. In rule 3, if the transmit filter detects that the concerned point code in an outbound network management message to be sent to the mate is equal to an internal point code, the sending routing node replaces the internal point code with the internal point code used by its mate to identify the remote application. If unique internal point codes are not supported, the sending routing node sends the message to its mate as is.

Rules 4–6 shown below illustrate examples of transmit filter rules that may be used by a transmit filter function for messages sent from a routing node to a remote application.

(4) If CPC equals IPC, then discard message.
(5) If DPC equals IPC, then replace DPC with true point code shared by the routing nodes and remote application.
(6) If OPC equals TPC, then replace OPC with private point code identifying message originator.

Rule 4 relates to a message that concerns an internal point code used within the routing nodes. The remote application is preferably unaware of internal point codes. Hence, this message should be discarded by the transmit filter function on the card associated with the remote application. Rule 5 relates for the case where a message is addressed to an internal point code associated with the remote application. Since the remote application does not recognize internal point codes, the destination point code is preferably changed to the true point code shared between the routing nodes and the remote application. Rule 6 relates to the case where a message is addressed from a true point code of a routing node. If a message from the true point code of a routing node, the originating point code is preferably changed to the private point code that uniquely identifies the message originator.

Rules 7–9 shown below are examples of rules that may be used by a transmit filter function on a link interface module that is not associated with a mate routing node or a remote application.

(7) If DPC equals IPC, DPC equals PPC, DPC equals mate PPC, or DPC equals mate IPC, then discard message.
(8) If CPC equals IPC, CPC equals mate IPC, CPC equals PPC, or CPC equals mate PPC, then discard message.
(9) If OPC equals PPC, then replace OPC with TPC.

Rule 7 and 8 relate to the case where messages addressed to an internal or private point code appear at the transmit filter function of a link interface module that is not connected to the mate node or the remote application. In this case, because internal point codes and private point codes are private to the network between the mate routing nodes and the remote applications, the messages should be discarded. Rule 9 relates to the case where a message originates from a private point code. In this instance, the OPC value in the message should be changed to the true point code shared by the routing nodes and the remote application.

Virtual Network Management Messaging

One unique aspect of the present invention involves the manner in which signaling network management messages are generated and propagated by the mate routing nodes with respect to the remote application(s) that they support. Such functionality may be provided by MTP primitives process 182 of DCM communications 110, as illustrated in FIG. 5 or network management process 172 of a LIM communication module, as shown in FIG. 4. FIG. 6 illustrates point codes and signaling links associated with routing nodes 100 and 102. In FIG. 6, routing nodes 100, 102, and remote application 104 share the true point code of 1-1-1. Routing nodes 100 and 102 also have self-identifying public point codes of 1-1-2 and 1-1-3. Routing node 100 has a private point code of 9-9-1 used to receive messages from routing node 102, and routing node 102 includes a private point code of 9-9-2 used to receive messages from routing node 100. Routing node 100 thus recognizes 9-9-2 as the mate private point code of routing node 102, and routing node 102 recognizes 9-9-1 as the mate private point code of routing node 100.

Routing node 100 includes the internal point code of 9-9-9 used to internally distribute messages. Similarly, routing node 102 includes the internal point code of 9-9-9 used to distribute messages within routing node 102. Accordingly, routing node 100 recognizes 9-9-9 as the mate internal point code of routing node 102. Similarly, routing node 102 recognizes the point code of 9-9-9 as the internal point code of routing nod node capable of using multiple public point code identities to communicate with PSTN nodes is described in commonly-assigned, co-pending U.S. patent application Ser. No. 09/969,173, the disclosure of which is incorporated herein by reference in its entirety.

Figure 6:
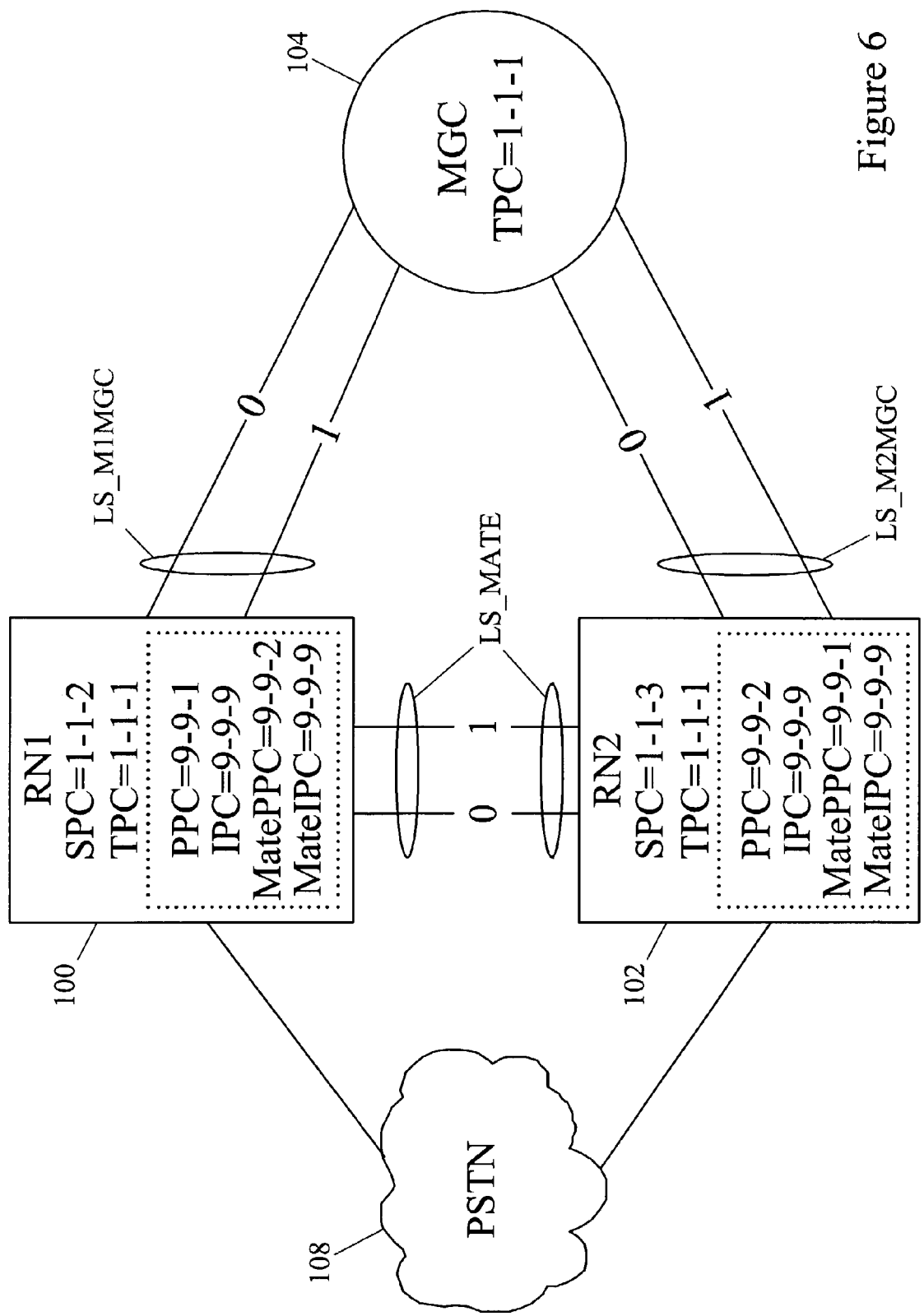
FIG. 6 is a network diagram illustrating signaling linksets between a mated pair of routing nodes and an associated remote application according to an embodiment of the present invention.

Routing nodes 100 and 102 are connected via a linkset referred to as LS_MATE, if FIG. 6. The linkset LS_MATE includes two signaling links, link 0 and link 1. Routing nodes 100 and 102 are redundantly connected to remote application 104 via linksets LS_M1MGC and LS_M2MGC, each of which includes two signaling links.

Figure 7:
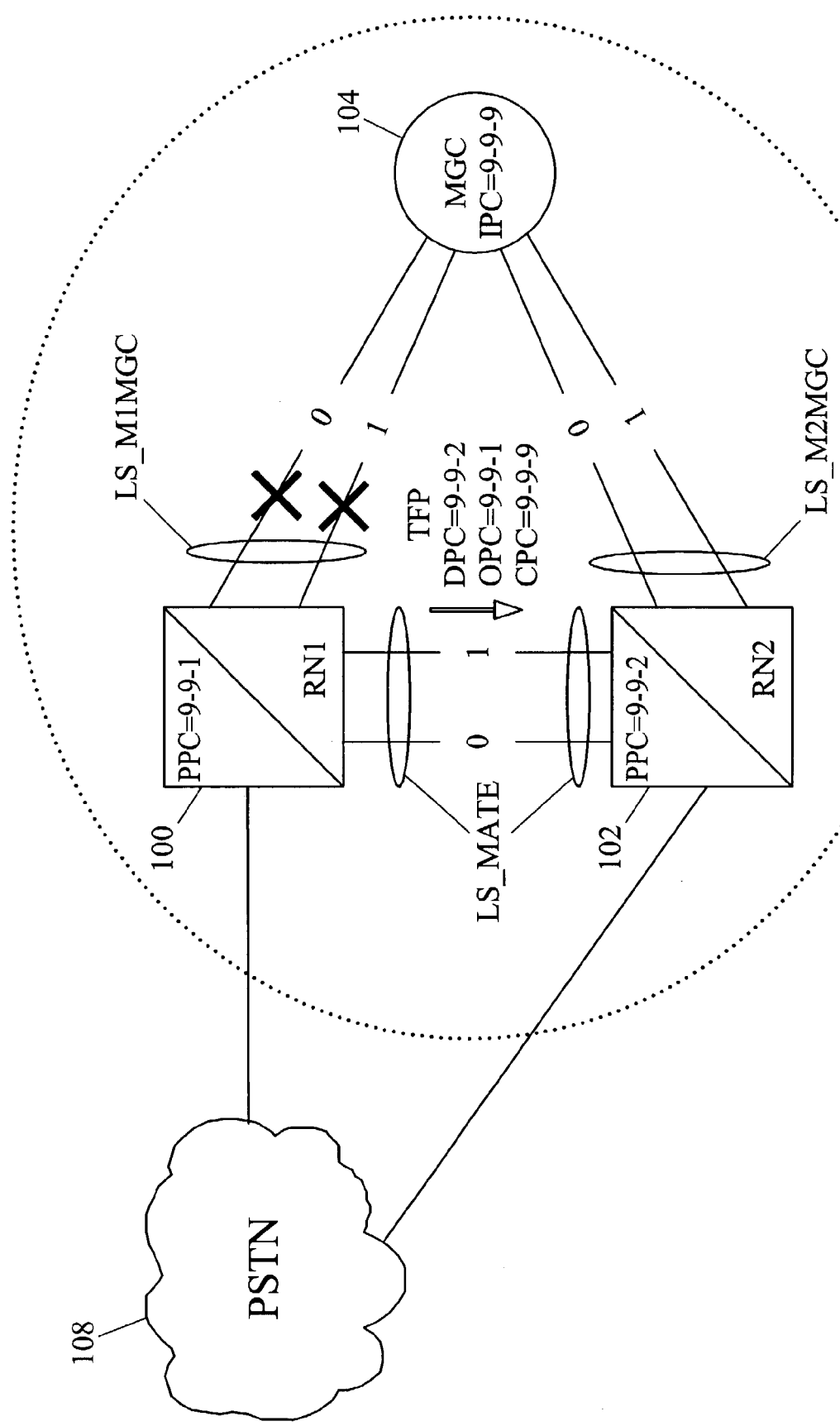
FIG. 7 is a network diagram illustrating a signaling linkset failure scenario and associated private signaling network management messaging between a mated pair of routing nodes according to an embodiment of the present invention.

FIG. 7 illustrates an exemplary network management function performed by routing nodes 100 and 102 on behalf of redundantly connected remote application 104. Referring to FIG. 7, linkset LS_M1MGC fails such that signaling messages may not be communicated directly from routing node 100 to remote application 104. In such a scenario, routing node 100 generates and distributes a "virtual" TFP message, which is distributed only to its mate routing node 102. In conventional network management, an STP that detected the failure of linkset LS_M1MGC would be required to send a network management message with DPC=1-1-1, OPC=1-1-1, and CPC=1-1-1, which would not result in appropriate changes to network routing tables. The present invention avoids such problematic messages using different private point codes in network management messages sent between mate routing nodes.

As indicated in FIG. 7, the virtual TFP message is addressed to the private point code of routing node 102 (i.e., DPC=9-9-2). The TFP message is addressed from the private point code of routing node 100 (i.e., OPC=9-9-1), and concerned point code value stored in the destination field of the TFP message is equal to the private IPC assigned to the remote application that is affected by the signaling linkset failure (i.e., CPC=IPC). As such, routing node 102 may update internal routing information, to reflect the unavailable status of a route to remote application 300 via routing node 100.

When considered in contrast to conventional SS7 network management, such virtual network management messaging provides a significant advantage. For example, in the scenario shown in FIG. 7, conventional SS7 network management would require that routing node 100 generate and distribute a TFP message containing only valid, public point codes. A TFP message notifies an adjacent node that the TFP message originator or sender is unable to deliver messages to the affected or concerned point code address. Consequently, all nodes receiving a TFP are required to stop sending signaling messages to the TFP originator that are destined for the concerned point code.

If routing node 100 were to send a conventional TFP to routing node 102, the destination point code and origination point code and concerned point code specified in the TFP would have to be valid, public point codes. Since remote application 104 and routing nodes 100 and 102 share a common public point code (i.e., TPC=1-1-1), the only valid, public point code that should be placed in the TFP message is the shared TPC of the nodes, or 1-1-1. Such a TFP would be invalid, and would not convey sufficient information as to allow a receiving routing node to properly update its routing status for the remote application.

In addition to selectively generating virtual TFP and other network management messages, routing nodes 100 and 102 are preferably also capable of rerouting messages over a secondary route when a primary route becomes unavailable. For example, in the failure scenario described above where the primary route becomes unavailable (linkset LS_M1MGC fails) and the secondary route is available (linksets LS_Mate and LS_M2MGC are available), routing node 100 is preferably capable of rerouting a received ISUP message to remote application 104 via routing node 102. After generating the TFP message as described above to disable communications over the unavailable routeset, assuming that the failed links are associated with DCM 110 illustrated in FIG. 3, DCM 110 routes the ISUP message to DCM 114 on routing node 102. In order to route the ISUP message to routing node 102, DCM 110 forwards the message to routing node 102 via link interface modules 116 and 118. Link interface module 116 identifies the ISUP messages being addressed to the IPC, changes the destination point code of each message to be the IPC that the mate uses to identify remote application 104 (if different from the IPC that routing node 100 uses to identify remote application 104) and then transmits each message to link interface module 118. Link interface module 118 identifies the ISUP messages being addressed to the IPC that routing node 102 uses to identify remote application 104. LIM 118 forwards the message to DCM 114. DCM 114 identifies the ISUP messages addressed to the IPC, changes the destination point code of each message to be the TPC, and transmits the message to remote application 104 over an available link. Thus, even when a route fails after an ISUP message has been received, routing nodes 100 and 102 according to the present invention are capable of rerouting the message over an available route.

If the remaining route to remote application 104 via node 102 should become unavailable (i.e., linkset LS_M2MGC fails), routing node 102 notifies mate routing node 100 of the route unavailability via another private or virtual TFP message that is sent only to routing node 100. Routing node 102 or routing node 100, upon determining that no routes exist to remote application 104, may generate a user part unavailable (UPU) message that identifies the particular user part associated with remote application 104, which is now unavailable. Such UPU messages are responsive in nature and consequently are generated in response to an attempt by another network node to access the unavailable user part.

In this example, MGC 104 supports an ISDN user part that is identified in the SS7 protocol by an SI value of 5. The destination or concerned point code value in the UPU message is set to the TPC of remote application 104 (i.e., TPC=1-1-1). Unlike the virtual TFP message, the UPU message is then transmitted to the node in the "public" network that was attempting to access the unavailable user part. Normal or conventional SS7 network management protocol would require that a TFP message be generated and transmitted in response to the complete loss of connectivity between routing node 102 and remote application 104, and as such, no signaling traffic, regardless of user part availability, would be delivered to either of the routing nodes for the reasons discussed above. However, because the routing nodes generate a UPU message, as opposed to a TFP message, in response to the complete isolation of remote application 108, only ISUP traffic (i.e., SI=5) will be prohibited. As such, signaling connection control part (SCCP) traffic (i.e., SI=3) may still be routed to and through routing nodes 100 and 102 to other network nodes. Again, such robust operating qualities are highly desirable to network operators.

In the example above, if the linkset LS_M1MGC becomes available again, then the primary route for the IPC becomes available. In order to inform other nodes of the primary route availability, routing node 100 may generate a virtual TFA message with DPC=matePPC (the private point code of routing node 102), OPC=PPC (the private point code of routing node 100, and CPC=mateIPC (the internal point code by which node 102 identifies remote application 104). Routing node 100 routes the TFA message to routing node 102. Routing node 102 uses the TFA message to update the status for the route to the remote application in its routing tables.

In a preferred embodiment of the invention, routing nodes 100 and 102 do not transmit network management messages concerning the shared TPC, since they are acting together as a signaling end point. If the PSTN links are available, then, by definition, the TPC is available to the PSTN, regardless of the state of the links to the remote application.

Figure 8:
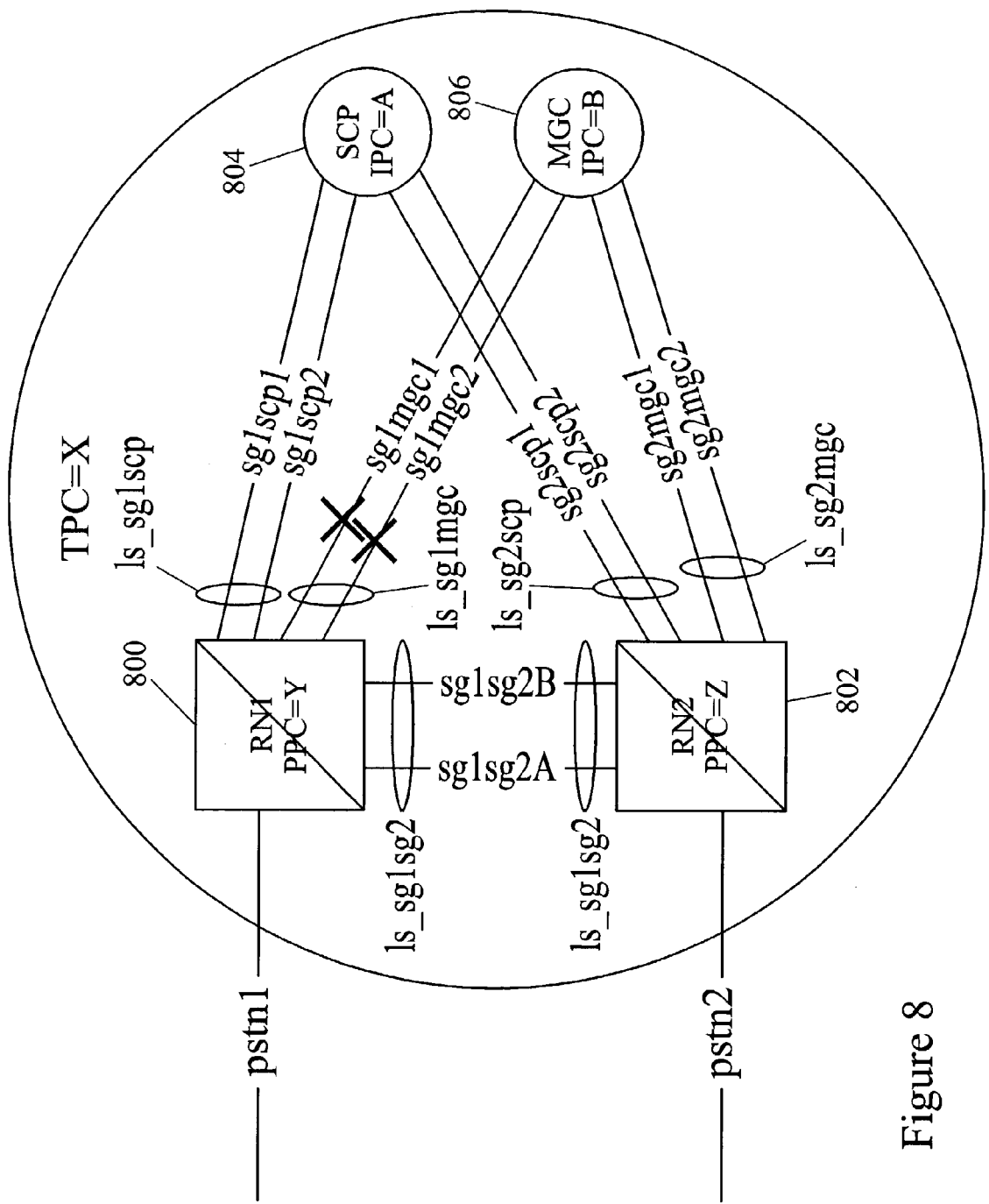
FIG. 8 is a network diagram illustrating a mated pair of routing nodes providing MTP routing and network management support on behalf of a remote application that shares the point code of the routing nodes according to an embodiment of the present invention.

FIG. 8 is a network diagram illustrating routing nodes connected to multiple remote applications according to an embodiment of the present invention. Referring to FIG. 8, routing nodes 800 and 802 are connected to remote applications 804 and 806. In the illustrated example, remote application 804 is a service control point (SCP) and remote application 806 is a media gateway controller (MGC). Routing nodes 800 and 802 use unique separate internal point codes for each remote application 804 and 806. Using unique, separate internal point codes to represent multiple applications allows routing and network management to be separately performed for each remote application. Because separate, unique point codes are used for each remote application, multiple remote applications can be supported by routing nodes according to the present invention.

Figure 9A:
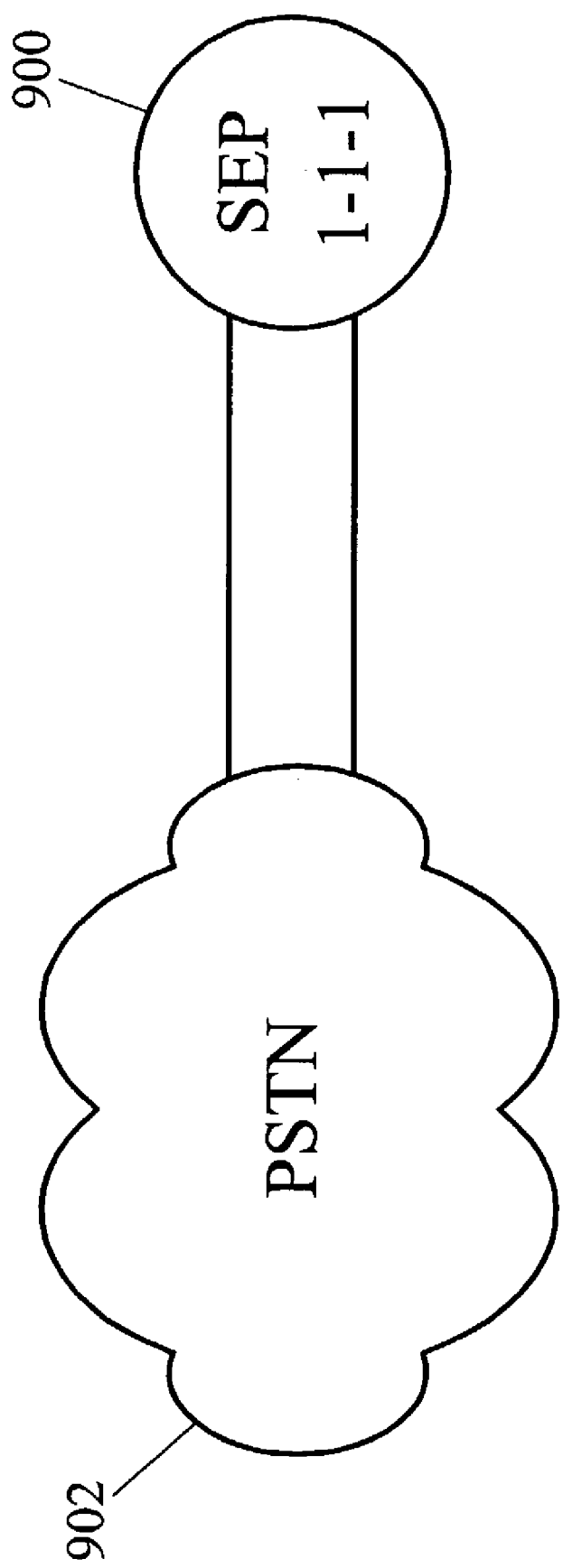
FIG. 9A is a network diagram illustrating a pair of routing nodes and a remote end office according to an embodiment of the present invention from the point of view of an SS7 network.
Figure 9B:
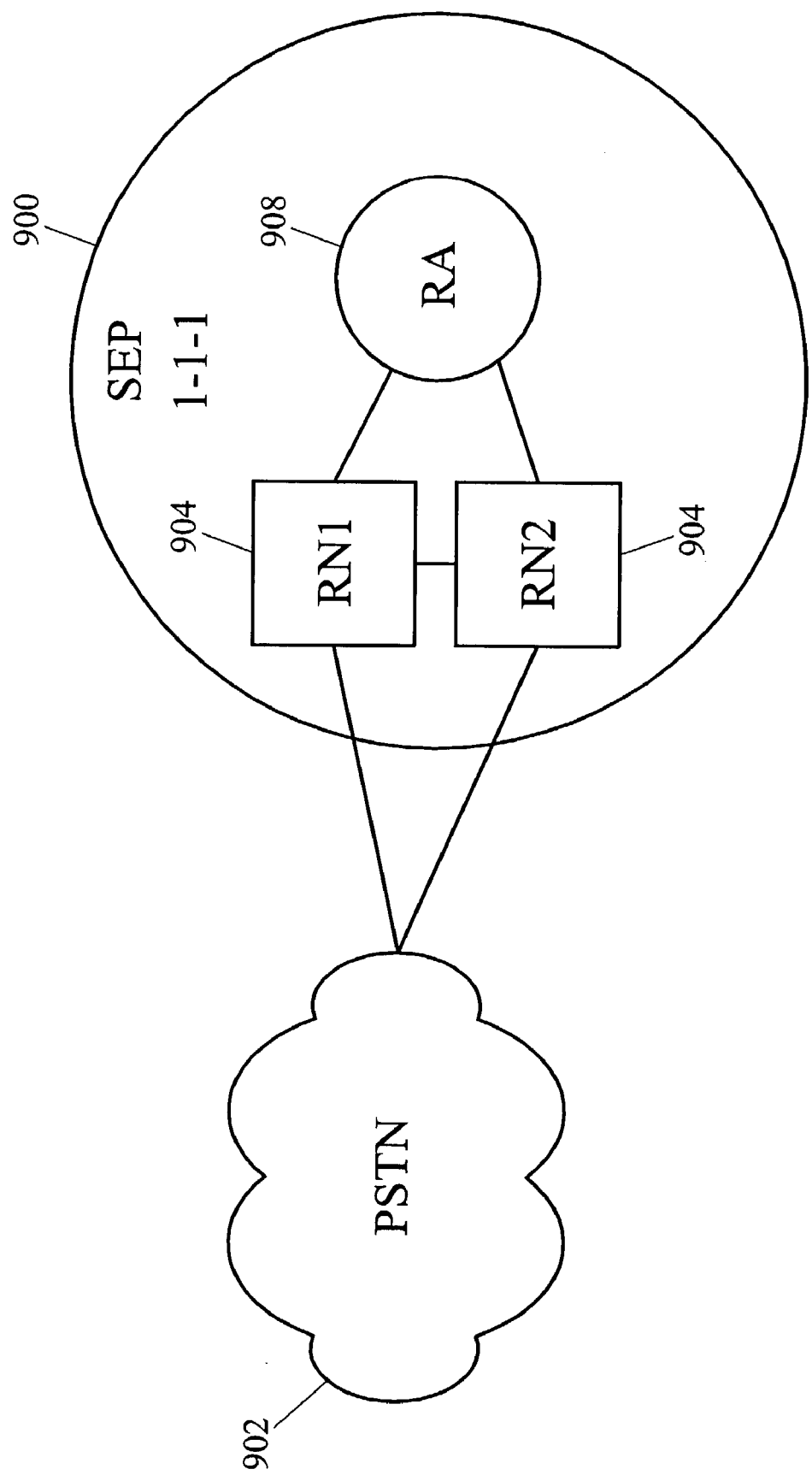
FIG. 9B is an internal view corresponding to the view in FIG. 9A.
Figure 9C:
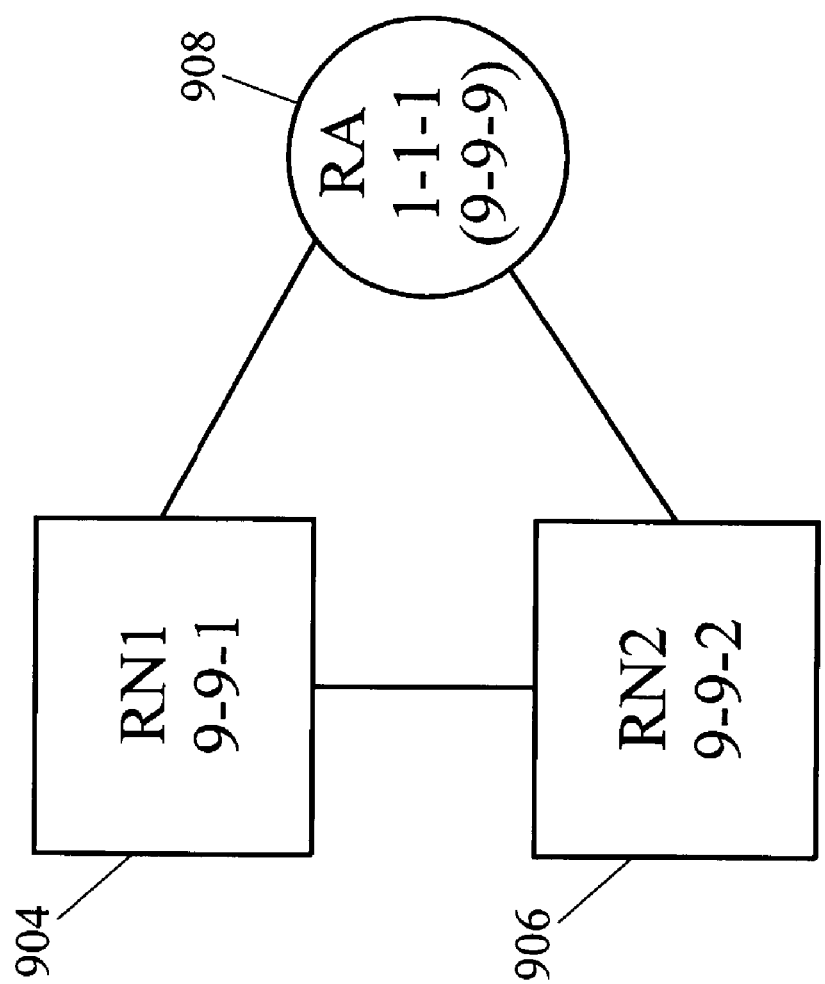
FIG. 9C is a network diagram illustrating a private SS7 network used by a pair of routing nodes and a remote application according to an embodiment of the present invention.

FIGS. 9A–9C illustrate exemplary views of routing nodes and remote applications to different nodes in the network. More particularly, FIG. 9A illustrates a signaling endpoint 900 that includes one or more pairs of routing nodes and one or more remote applications from the point of view PSTN 902. Because the routing nodes and remote applications use a shared true point code when communicating with PSTN 902, the combination of routing nodes and remote applications appears as a signaling endpoint to PSTN 902. FIG. 9B illustrates the internal architecture of signaling endpoint 900 illustrated in FIG. 9A. In FIG. 9B, signaling endpoint 900 includes routing nodes 904 and 906 and remote application 908.

FIG. 9C illustrates a private SS7 network formed by routing nodes 904, 906 and remote application 908. In the illustrated example, routing nodes 904 and 906 utilize private point codes 9-9-1 and 9-9-2 when communicating with each other. Routing nodes 904 and 906 use internal point code 9-9-9 to identify messages destined for remote application 908. Remote application 908 only recognizes a point code of 1-1-1, which is the point code shared by routing nodes 904, 906, and remote application 908.

Figure 10:
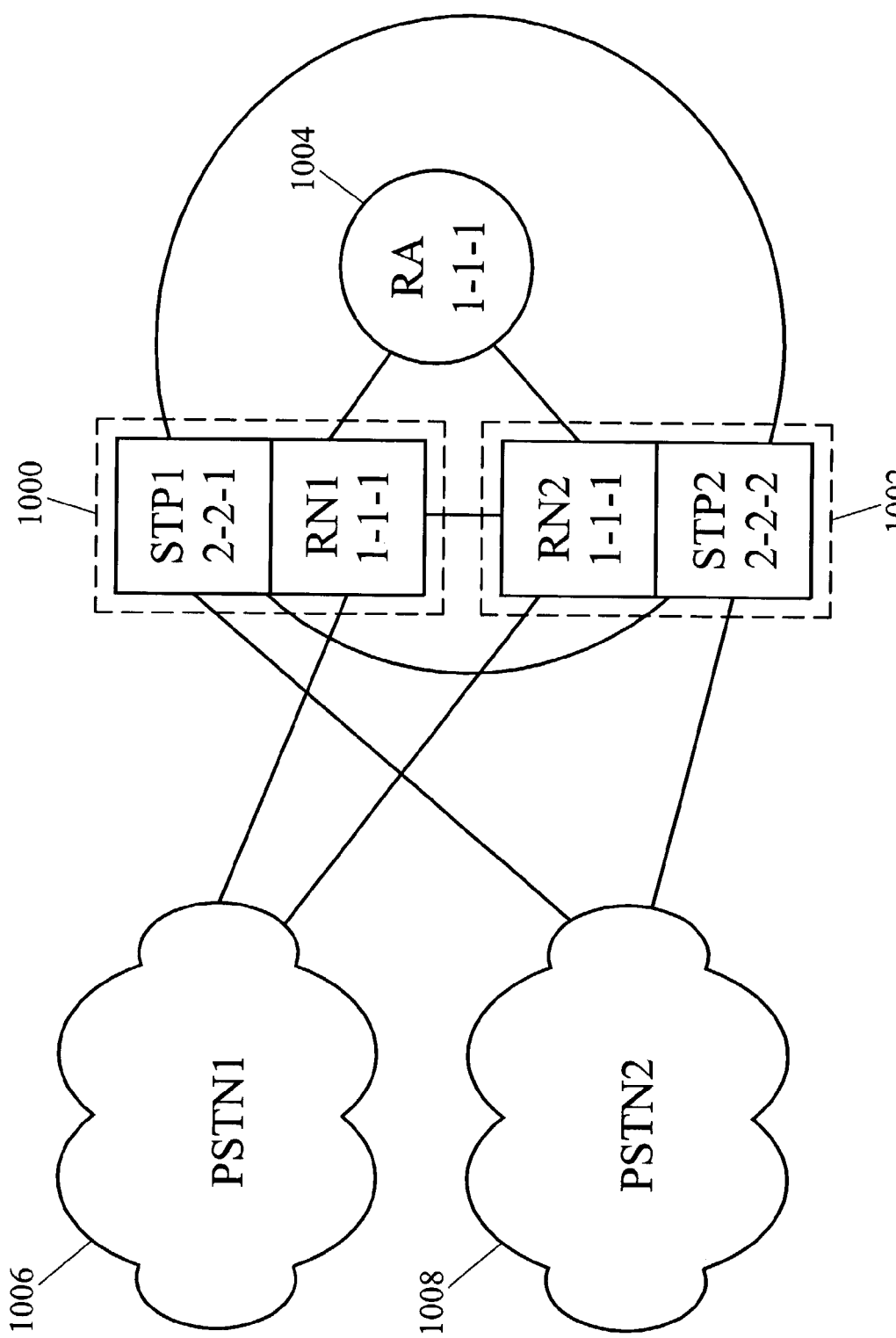
FIG. 10 is a network diagram illustrating signaling message routing nodes that provide both remote application support and normal STP functionality according to an embodiment of the present invention.

FIG. 10 is a network diagram illustrating routing nodes 1000 and 1002 for providing remote application support on behalf of remote application 1004 and for performing STP functions. For example, routing nodes 1000 and 1002 include STP functionality and remote application support functionality and the ability to change behavior depending on the sender of a message. For example, if a message is received from PSTN1 1006, routing nodes 1000 and 1002 may provide remote application support by performing the complex MTP3 message distribution and point code replacement functions described above. For messages received from PSTN2 1008, routing nodes 1000 and 1002 may perform normal STP functions, such as MTP3 routing based on the DPC in the message and global title translation. Thus, the present invention includes routing nodes that are capable of functioning both in STP mode and remote application support mode based on the network that forwards message to the routing nodes.

Routing All User Part Traffic to Remote Application

Routing nodes according to the present invention may be configured such that all user-part traffic arriving from the PSTN is routed to a remote application. In such a scenario, if a routing node has no available routes the remote application, then the routing node may cause its PSTN links to become unavailable, using MTP3 procedures, such as local processor outage. By forcing its PSTN links to become unavailable, the routing node forces the adjacent nodes to reroute traffic that would otherwise have been sent to it. If, after some period, the remote application becomes available, then the routing node would cause its PSTN links to become available, thereby allowing traffic to be routed through the routing node.

CONCLUSIONS

Thus, as described above, routing nodes according to the present invention provide network management and routing support for one or more remote applications. The routing nodes use point code replacement and the SS7 message transfer part protocol to distribute messages between each other and to the remote application. If multiple remote applications are supported, the routing nodes may utilize separate unique internal point codes to represent the multiple remote applications. In addition, the routing nodes are preferably capable of functioning in STP mode or in remote application support mode based on the network-from which a message is received.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for routing messages between a mated pair of routing nodes having a distributed internal processing architecture and one or more redundantly connected remote applications, the method comprising:

(a) receiving a signaling message at a first communications module in a first routing node of a mated pair of routing nodes, the mated pair of routing nodes being redundantly connected to one or more remote applications, the signaling message being addressed to a first point code shared by the mated pair of routing nodes and the one or more remote applications;

(b) determining, based on information in the signaling message, whether to forward the message to one of the remote applications or to a second routing node of the mated pair of routing nodes;

(c) in response to determining to forward the message to one of the remote applications, replacing the first point code with a second point code used internally by the first and second routing nodes to identify the remote application and distributing the message to a second communications module within the first routing node using the second point code, the second communications module being associated with the remote application; and (d) in response to determining to forward the message to the second routing node, replacing the first point code with a third point code used internally by the first routing node to identify the second routing node and distributing the signaling message to a third communications module within the first routing node based on the third point code, the third communicatidns module being associated with the second routing node.

2. The method of claim 1 wherein receiving a signaling message includes receiving an SS7 signaling message at an SS7 link interface module.

3. The method of claim 1 wherein receiving a signaling message includes receiving an IP-encapsulated SS7 signaling message at a data communications module.

4. The method of claim 1 wherein determining whether to forward the message to one of the remote applications or to a second routing node of the mated pair of routing nodes includes performing a lookup in a remote application table based on a destination point code in the signaling message and one or more additional parameters in the signaling message.

5. The method of claim 4 wherein the additional parameters in the signaling message include a service indicator.

6. The method of claim 1 wherein distributing the signaling message to a second communications module within the first routing node based on the second point code includes performing a lookup in an MTP routing table located on the first communications module to locate a bus address of the second communications module based on the second point code.

7. The method of claim 1 wherein distributing the signaling message to a third communications module within the first routing node based on the third point code includes performing a lookup in an MTP routing table on the first communications module using the third point code as a key and determining a bus address of the third communications module based on the third point code.

8. The method of claim 1 comprising, at the second communications module, and, prior to forwarding the message to the remote application, replacing the second point code with the first point code.

9. The method of claim 1 comprising, at the third communications module, and, prior to forwarding the message to the second routing node, inserting a fourth point code in an originating point code field in the signaling message to identify the first routing node as the message originator to the second routing node.

10. The method of claim 1 comprising determining that the message should not be forwarded to the remote application or to the second routing node of the mated pair of routing nodes, and in response, forwarding the signaling message to a fourth communications module associated with a public switched telephone network (PSTN) node.

11. A method for utilizing message transfer part (MTP) routing to communicate messages between routing nodes of a mated pair of routing nodes and a remote application that share a point code, the method comprising:

(a) communicating with nodes in a public switched telephone network (PSTN) using a first point code shared by a mated pair of routing nodes and a remote application;

(b) communicating messages between routing nodes of the mated pair of routing nodes using second and third point codes used by the routing nodes to identify each other;

(c) communicating messages intended for the remote application between the routing nodes using a fourth point code utilized internally by the routing nodes to identify the remote application; and (d) identifying messages from the nodes in the PSTN addressed to the first point code as being intended for the remote application using a parameter in each of the signaling messages in combination with the first point code.

12. The method of claim 11 wherein communicating messages between the routing nodes using second and third point codes includes replacing a point code value in an originating point code (OPC) field of a message to be transmitted from the first routing node to the second routing node with the second point code and replacing a point code value in an OPC field of a message to be transmitted from the second routing node to the first routing node with the third point code.

13. The method of claim 11 wherein communicating messages between the routing nodes using the fourth point code includes replacing point code values in destination point code (DPC) fields of messages intended for the remote application with the fourth point code.

14. The method of claim 11 wherein the first point code comprises a public point code and the second, third and fourth point codes comprise private point codes.

15. The method of claim 11 wherein the routing nodes are coupled to a plurality of remote applications and wherein the method further comprises communicating messages intended for the remote applications between the routing nodes using a unique internal point code for each remote application.

16. The method of claim 11 wherein step (b) includes communicating network management messages between the routing nodes using the second and third point codes in the OPO and DPC fields of the network management messages and using the fourth point code to identify the remote application in network management messages concerning the remote application.

17. The method of claim 11 comprising replacing the first point code in the messages identified as being intended for the remote application with the fourth point code and using the fourth point code to distribute the messages intended for the remote application between processing modules in the routing nodes.

18. A method for utilizing message transfer part (MTP) routing to communicate messages between routing nodes of a mated pair of routing nodes and a remote application that share a point code, the method comprising:

(a) communicating with nodes in a public switched telephone network (PSTN) using a first point code shared by a mated pair of routing nodes and a remote application;

(b) communicating messages between routing nodes of the mated pair of routing nodes using second and third point codes used by the routing nodes to identify each other; and (c) communicating messages intended for the remote application between the routing nodes using a fourth point code utilized internally by the routing nodes to identify the remote application, wherein communicating with nodes in the PSTN using the first point code includes replacing originating point code values in messages destined for the PSTN with the first point code.

19. A method for utilizing message transfer part (MTP) routing to communicate messages between routing nodes of a mated pair of routing nodes and a remote application that share a point code, the method comprising:

(a) communicating with nodes in a public switched telephone network (PSTN) using a first point code shared by a mated pair of routing nodes and a remote application;

(b) communicating messages between routing nodes of the mated pair of routing nodes using second and third point codes used by the routing nodes to identify each other;

(c) communicating messages intended for the remote application between the routing nodes using a fourth point code utilized internally by the routing nodes to identify the remote application, wherein said communicating messages intended for the remote application between the routing nodes using the fourth point code includes replacing point code values in destination point code (DPC) fields of messages intended for the remote application with the fourth point code, and (d) replacing the fourth point code values in the DPC fields of the messages intended for the remote application with the first point code before sending the messages to the remote application.

20. A system including pair of routing nodes having signal transfer point (STP) functionality and remote application support functionality, the system comprising:

(a) a first routing node capable of operating in a first mode for performing normal STP functions and a second mode for providing remote application support; and (b) a second routing node for functioning in the first mode for performing normal STP functions, and in the second mode for providing remote application support, wherein the first and second routing nodes are adapted to switch between the first and second modes of operation based on the origins of received signaling messages, wherein switching between the first and second modes of operation includes operating in the first mode in response to receiving a signaling message from a first public switched telephone network (PSTN) and operating in the second mode in response to receiving a signaling message from a second PSTN.

21. The system of claim 20 wherein the first and second routing nodes each include a distributed internal processing architecture and the first and second routing nodes are adapted to distribute messages internally among processing modules using a public point code and multiple private point codes.

22. The system of claim 20 wherein the first and second routing nodes are adapted to associate a plurality of different private point codes with a plurality of different remote applications.

23. The system of claim 20 wherein operating in the first mode includes performing MTP routing of messages based on public SS7 point codes.

24. The system of claim 20 wherein providing remote application support includes using MTP routing and private point code replacement to distribute messages between the routing nodes.

25. A system including pair of routing nodes having signal transfer point (STP) functionality and remote application support functionality, the system comprising:

(a) a first routing node capable of operating in a first mode for performing normal STP functions and a second mode for providing remote application support; and (b) a second routing node for functioning in the first mode for performing normal STP functions, and in the second mode for providing remote application support, wherein the first and second routing nodes are adapted to switch between the first and second modes of operation based on the origins of received signaling messages, wherein operating in the first mode includes performing MTP routing of messages based on public SS7 point codes contained in destination point code (DPC) fields of the messages without replacing the point code values in the DPC fields with private point codes.

26. A remote application support system for supporting multiple remote applications using multiple internal point codes, the system comprising:

(a) a first routing node for communicating with a first network using a first public point code and for internally distributing messages between processing modules in the first routing node intended for a plurality of remote applications and using a plurality of different private point codes; and (b) a second routing node coupled to the first routing node, the second routing node being configured to communicate with the first network using the first point code and to internally distribute messages intended for the remote applications between processing modules in the second routing node using the private point codes, wherein the first routing node, the second routing node and the plurality of remote applications all have, as an address in the first network, the first public point code.

27. The system of claim 26 wherein the first and second routing nodes each include a distributed internal processing architecture having a plurality of link interface modules connected via a bus.

28. The system of claim 27 wherein the first and second routing nodes are configured to use the private point codes to distribute messages between the link interface modules.

29. The system of claim 27 wherein the plurality of link interface modules includes first link interface modules in the first and second routing nodes for communicating with the first network, second link interface modules for communicating messages between the first and second routing nodes, and third link interface modules for communicating with the remote applications.

30. The system of claim 26 wherein the first and second routing nodes are configured to communicate network management messages between each other concerning the remote applications using the private point codes to identify the remote applications.

31. A remote application support system for supporting multiple remote applications using multiple internal point codes, the system comprising:
  (a) a first routing node for communicating with a first network using a first public point code and for internally distributing messages intended for a plurality of remote applications and using a plurality of different private point codes; and
  (b) a second routing node coupled to the first routing node, the second routing node being configured to communicate with the first network using the first point code and to internally distribute messages intended for the remote applications using the private point codes;
wherein:
  the first routing node, the second routing node and the plurality of remote applications all have, as an address in the first network, the first public point code,
  the first and second routing nodes each include a distributed internal processing architecture having a plurality of link interface modules connected via a bus; the plurality of link interface modules includes first link interface modules in the first and second routing nodes for communicating with the first network, second link interface modules for communicating messages between the first and second routing nodes, and third link interface modules for communicating with the remote applications; and
  the first link interface modules each include a transmit filter for preventing messages having the private point codes from being sent to the first network, the second link interface modules each include a transmit filter for replacing originating point code (OPC) values in messages communicated between the first and second routing nodes with private point codes, and the third link interface modules each include a transmit filter for replacing destination point code (DPC) values in messages destined for the remote applications with the first point code.

* * * * *

UNITED STATES PATENT AND TRADEMARK OFFICE
CERTIFICATE OF CORRECTION

PATENT NO. : 7,197,036 B2  Page 1 of 1
APPLICATION NO. : 10/376001
DATED : March 27, 2007
INVENTOR(S) : Jeffrey Alan Craig It is certified that error appears in the above-identified patent and that said Letters Patent is hereby corrected as shown below:

Title page, insert item (73) Assignee
    --Tekelec, Morrisville, NC (US)--

Signed and Sealed this

Eleventh Day of August, 2009

David J. Kappos
*Director of the United States Patent and Trademark Office*